(12) United States Patent
Propst et al.

(10) Patent No.: US 12,094,358 B2
(45) Date of Patent: Sep. 17, 2024

(54) SIMULATOR FOR PRACTICING SURGERY OR PROCEDURES INVOLVING THE NECK AND AIRWAY AND METHOD OF USE THEREOF

(71) Applicant: AWESIM MEDICAL CORPORATION, Toronto (CA)

(72) Inventors: Evan Jon Propst, Toronto (CA); Ashley Rana Deonarain, Brampton (CA); Thomas Looi, Markham (CA)

(73) Assignee: AWESIM MEDICAL CORPORATION, Toronto (CA)

( * ) Notice: Subject to any disclaimer, the term of this patent is extended or adjusted under 35 U.S.C. 154(b) by 717 days.

(21) Appl. No.: 16/915,270

(22) Filed: Jun. 29, 2020

(65) Prior Publication Data

US 2020/0410898 A1   Dec. 31, 2020

Related U.S. Application Data

(60) Provisional application No. 62/868,727, filed on Jun. 28, 2019.

(51) Int. Cl.
  *G09B 23/30* (2006.01)
  *G09B 23/28* (2006.01)
(52) U.S. Cl.
  CPC .......... *G09B 23/285* (2013.01); *G09B 23/30* (2013.01)
(58) Field of Classification Search
  None
  See application file for complete search history.

(56) References Cited

U.S. PATENT DOCUMENTS

| | | | | |
|---|---|---|---|---|
| 4,938,696 A * | 7/1990 | Foster | .................... | G09B 23/30 434/272 |
| 5,846,087 A | 12/1998 | Scherer | | |
| 2007/0218438 A1 | 9/2007 | Sanders et al. | | |
| 2011/0091855 A1* | 4/2011 | Miyazaki | ............. | G09B 23/281 434/267 |
| 2012/0028231 A1* | 2/2012 | Misawa | ................. | G09B 23/30 434/267 |

(Continued)

*Primary Examiner* — James B Hull
(74) *Attorney, Agent, or Firm* — HILL & SCHUMACHER

(57) ABSTRACT

The present disclosure provides a medical training simulation apparatus for training medical professionals, emergency medical support personnel, military personnel, parents or families of persons who have or will be undergoing neck or airway surgery, or any other persons requiring a simulator for learning the anatomy or practicing procedures or surgery of the neck and/or airway. The apparatus may include a simulated base that may be free standing or may rest on a mannequin and may have a hole for accessing the simulated airway, simulated skin, simulated fat, simulated lymph nodes, simulated neck musculature, simulated arteries and veins with simulated blood therein, simulated thyroid gland, simulated parathyroid glands, simulated laryngeal and tracheal cartilage including the hyoid bone, thyroid cartilage, cricoid cartilage, tracheal rings, epiglottis and arytenoid cartilages, mucosa, recurrent laryngeal nerves, trachealis muscle, esophagus and prevertebral fascia. The apparatus may include alteration or addition of one or more anatomical parts to simulate congenital or acquired anomalies. One or more parts of the simulation apparatus may be disposable or replaceable.

20 Claims, 16 Drawing Sheets

(56) References Cited

U.S. PATENT DOCUMENTS

| | | |
|---|---|---|
| 2012/0202180 A1 | 8/2012 | Stock et al. |
| 2014/0017650 A1 | 1/2014 | Romero |
| 2014/0154656 A1* | 6/2014 | Segall .................... G09B 23/30 434/265 |
| 2014/0302475 A1* | 10/2014 | Sakezles ................ G09B 23/34 434/270 |
| 2019/0147769 A1* | 5/2019 | Hofstetter .............. G09B 23/34 434/273 |

* cited by examiner

SIMULATOR FOR PRACTICING SURGERY OR PROCEDURES INVOLVING THE NECK AND AIRWAY AND METHOD OF USE THEREOF

FIELD

The present disclosure relates to training systems that simulate body parts to build skills to conduct medical examinations and/or procedures, and more particularly it relates to a simulator for practicing surgery or procedures involving the neck and airway and method of use thereof.

BACKGROUND

Surgical and procedural simulation is gaining popularity because it provides learners the opportunity to practice invasive procedures without inflicting harm to patients. Medical trainees face work-hour restrictions and low case incidence making mastering surgical and procedural skills increasingly difficult. Emergency medical support and military personnel may rarely see certain life-saving procedures involving the neck and airway but must be equipped to perform them in an emergency setting. Parents or families of persons who have or will be undergoing neck or airway surgery may need to quickly become familiar with related procedures after having little or no prior exposure to them. While some learners may prefer the realism and anatomical accuracy of animal models or human cadavers over synthetic simulators, they can be prohibitively expensive, difficult to obtain, can pose ethical dilemmas and often require specialized laboratories and disposal. Moreover, preserved cadavers are too rigid and do not represent live human tissue, animal models are often anatomically different than humans, and neither can easily simulate congenital or acquired anatomical anomalies.

Surgery and procedures involving the neck and airway include, but are not limited to, tracheostomy, tracheostomy tube change, cricothyroidotomy, open airway surgical reconstruction, expansion or resection, saccular cyst excision, laryngeal cleft repair, laryngeal web excision, arytenoidectomy, aortopexy, tracheopexy, esophageal surgery including but not limited to tracheoesophageal fistula closure, thyroidectomy, parathyroidectomy, excision of lymph node(s)/mass(es)/tumor(s)/cyst(s)/sinus(es)/fistula(e), reconstruction of skin and soft tissue defects.

Prior simulators for practicing airway procedures are known. However, they tend to be highly simplified and are of limited value as teaching tools. For example, U.S. Pat. No. 1998/5846087 issued to Scherer et al. and No. 2007/0218438 A1 issued to Sanders et al., disclose hollow body semi-rigid necks with an internal cavity and a stoma that can receive a tracheostomy tube. However, the neck and airway do not include the soft tissues and cartilaginous structures seen in the human neck and airway. U.S. Pat. No. 2012/0202180 issued to Stock et al., and U.S. Pat. No. 2014/0017650 A1 issued to Romero, describe tracheal modules with a severable membrane for receiving an incision to simulate a procedure. However, the models lack the soft tissues of the neck and the trachea is a single unrealistic unit with prefabricated holes.

Thus, there is a need for a neck simulator with mechanical and tactile properties close to those of human patients for surgeons to practice on.

SUMMARY OF THE INVENTION

The present disclosure provides a simulator for practicing surgery or procedures involving the neck and airway, comprising:

a) a rigid base having a pattern of grooves and/or indentations on a top surface thereof;
b) an anatomical structure/tissue layer to mimic the neck and airway of a person mounted on the top surface of the rigid base;
c) the anatomical structure/tissue layer comprised of:
skin mimicked by a polymer material having a tensile strength in a range from about 100 to about 650 psi, a modulus M100 in a range from about 5 to about 150 psi, and a Die B tear strength in a range from about 10 to about 200 pli (about 1.8 to about 26.3 kilonewton per meter (kN/m));
fat mimicked by a polymer material having a tensile strength in a range from about 10 to about 600 psi, a modulus M100 in a range from about 1 to about 100 psi, and a Die B tear strength in a range from about 10 to about 150 pli (about 1.8 to about 8.8 kN/m);
lymph nodes mimicked by a polymer material having a tensile strength in a range from about 10 to about 600 psi, a modulus M100 in a range from about 1 to about 100 psi, and a Die B tear strength in a range from about 10 to about 150 pli (about 1.8 to about 8.8 kN/m);
muscles synthesized to mimic sternocleidomastoideoles, sternohyoid muscles, sternothyroid muscles, omohyoid muscles, thyrohyoid muscles, and cricothyroid muscles, the muscles comprised of a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
blood vessels synthesized to mimic anterior jugular veins, external jugular veins, internal jugular veins and carotid arteries, the blood vessels comprised of a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
a thyroid gland mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
parathyroid glands mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
laryngeal and tracheal cartilage synthesized to mimic hyoid bone, thyroid cartilage, cricoid cartilage, tracheal rings, epiglottis, arytenoid cartilages, mimicked by a polymer material having a tensile strength in a range from about 100 to about 1000 psi, a modulus M100 in a range from about 10 to about 450 psi, and a Die B tear strength in a range from about 50 to about 250 pli (about 8.8 to about 43.8 kN/m);
mucosa mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m); and recurrent laryngeal nerves mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m); and trachealis muscle mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m); and esophagus mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m); and prevertebral fascia mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);

The present disclosure provides a simulator wherein the polymer material mimicking skin has a tensile strength in a range from about 150 to about 600 psi, a modulus M100 in a range from about 15 to about 100 psi, and a Die B tear strength in a range from about 60 to about 150 pli, and wherein the polymer mimicking fat has a tensile strength in a range from about 20 to about 550 psi, a modulus M100 in a range from about 2 to about 50 psi, and a Die B tear strength in a range from about 15 to about 100 pli, and wherein the polymer material mimicking the lymph nodes has a tensile strength in a range from about 20 to about 550 psi, a modulus M100 in a range from about 2 to about 50 psi, and a Die B tear strength in a range from about 15 to about 100 pli, and wherein the polymer material mimicking the muscles has a tensile strength in a range from about 100 to about 550 psi, a modulus M100 in a range from about 3 to about 85 psi, and a Die B tear strength in a range from about 15 to about 120 pli, and wherein the polymer mimicking the blood vessels has a tensile strength in a range from about 100 to about 550 psi, a modulus M100 in a range from about 3 to about 85 psi, and a Die B tear strength in a range from about 15 to about 120 pli, and wherein the polymer material mimicking the thyroid gland has a tensile strength in a range from about 100 to about 550 psi, a modulus M100 in a range from about 3 to about 85 psi, and a Die B tear strength in a range from about 15 to about 120 pli, and wherein the polymer material mimicking the parathyroid glands has a tensile strength in a range from about 100 to about 550 psi, a modulus M100 in a range from about 3 to about 85 psi, and a Die B tear strength in a range from about 15 to about 120 pli, and wherein the polymer material mimicking the hyoid bone, thyroid cartilage, cricoid cartilage, tracheal rings, epiglottis and arytenoid cartilages have a tensile strength in a range from about 150 to about 950 psi, a modulus M100 in a range from about 60 to about 400 psi, and a Die B tear strength in a range from about 100 to about 200 pli, and wherein the polymer material mimicking the mucosa has a tensile strength in a range from about 100 to about 550 psi, a modulus M100 in a range from about 3 to about 85 psi, and a Die B tear strength in a range from about 15 to about 120 pli, and wherein the polymer material mimicking the recurrent laryngeal nerves has a tensile strength in a range from about 100 to about 550 psi, a modulus M100 in a range from about 3 to about 85 psi, and a Die B tear strength in a range from about 15 to about 120 pli, and wherein the polymer material mimicking the esophagus has a tensile strength in a range from about 100 to about 550 psi, a modulus M100 in a range from about 3 to about 85 psi, and a Die B tear strength in a range from about 15 to about 120 pli, and wherein the polymer material mimicking the prevertebral fascia has a tensile strength in a range from about 100 to about 550 psi, a modulus M100 in a range from about 3 to about 85 psi, and a Die B tear strength in a range from about 15 to about 120 pli.

The present disclosure provides a simulator wherein the polymer material mimicking skin has a tensile strength in a range from about 530 to about 570 psi, a modulus M100 in a range from about 30 to about 70 psi, and a Die B tear strength in a range from about 100 to about 140 pli, and wherein the polymer mimicking fat has a tensile strength in a range from about 80 to about 120 psi, a modulus M100 in a range from about 3 to about 25 psi, and a Die B tear strength in a range from about 20 to about 44 pli, and wherein the polymer material mimicking the lymph nodes has a tensile strength in a range from about 80 to about 120 psi, a modulus M100 in a range from about 3 to about 25 psi, and a Die B tear strength in a range from about 20 to about 44 pli, and wherein the polymer material mimicking the muscles has a tensile strength in a range from about 140 to about 180 psi, a modulus M100 in a range from about 5 to about 28 psi, and a Die B tear strength in a range from about 20 to about 50 pli, and wherein the polymer mimicking the blood vessels has a tensile strength in a range from about 140 to about 180 psi, a modulus M100 in a range from about 5 to about 28 psi, and a Die B tear strength in a range from about 20 to about 50 pli, and wherein the polymer material mimicking the thyroid gland has a tensile strength in a range from about 140 to about 180 psi, a modulus M100 in a range from about 5 to about 28 psi, and a Die B tear strength in a range from about 20 to about 50 pli, and wherein the polymer material mimicking the parathyroid glands has tensile strength in a range from about 140 to about 180 psi, a modulus M100 in a range from about 5 to about 28 psi, and a Die B tear strength in a range from about 20 to about 50 pli, and wherein the polymer material mimicking the hyoid bone, thyroid cartilage, cricoid cartilage, tracheal rings, epiglottis and arytenoid cartilages have a tensile strength in a range from about 860 to about 900 psi, a modulus M100 in a range from about 280 to about 320 psi, and a Die B tear strength in a range from about 120 to about 160 pli, and wherein the polymer material mimicking the mucosa has a tensile strength in a range from about 140 to about 180 psi, a modulus M100 in a range from about 5 to about 28 psi, and a Die B tear strength in a range from about 20 to about 50 pli, and wherein the polymer material mimicking the recurrent laryngeal nerves has a tensile strength in a range from about 140 to about 180 psi, a modulus M100 in a range from about 5 to about 28 psi, and a Die B tear strength in a range from about 20 to about 50 pli, and wherein the polymer material mimicking the esophagus has a tensile strength in a range from about 140 to about 180 psi, a modulus M100 in a range from about 5 to about 28 psi, and a Die B tear strength in a range from about 20 to about 50 pli, and wherein the polymer material mimicking the prevertebral fascia has a tensile strength in a range from about 140 to about 180 psi, a modulus M100 in a range from about 5 to about 28 psi, and a Die B tear strength in a range from about 20 to about 50 pli.

The present disclosure provides a simulator wherein the polymer material mimicking the skin has a tensile strength of about 550 psi, a modulus M100 of about 49 psi, and a Die B tear strength of about 120 pli.

and wherein the polymer material mimicking the fat has a tensile strength of about 100 psi, a modulus M100 of about 5 psi, and a Die B tear strength of about 24 pli, and and wherein the polymer material mimicking the lymph nodes has a tensile strength of about 100 psi, a modulus M100 of about 5 psi, and a Die B tear strength of about 24 pli, and wherein the polymer material mimicking the muscles has a tensile strength of about 160 psi, a modulus M100 of about 8 psi, and a Die B tear strength of about 30 pli, and wherein the polymer material mimicking the blood vessels has a tensile strength of about 160 psi, a modulus M100 of about 8 psi, and a Die B tear strength of about 30 pli, and wherein the polymer material mimicking the thyroid gland has a tensile strength of about 160 psi, a modulus M100 of about 8 psi, and a Die B tear strength of about 30 pli, and wherein the polymer material mimicking the parathyroid glands has a tensile strength of about 160 psi, a modulus M100 of about 8 psi, and a Die B tear strength of about 30 pli, and wherein the polymer material mimicking the hyoid bone, thyroid cartilage, cricoid cartilage, tracheal rings, epiglottis and arytenoid cartilages has a tensile strength of about 880 psi, a modulus M100 of about 300 psi, and a Die B tear strength of about 136 pli, and wherein the polymer material mimicking the mucosa has a tensile strength of about 160 psi, a modulus M100 of about 8 psi, and a Die B tear strength of about 30 pli, and wherein the polymer material mimicking the recurrent laryngeal nerves has a tensile strength of about 160 psi, a modulus M100 of about 8 psi, and a Die B tear strength of about 30 pli, and wherein the polymer material mimicking the trachealis muscle has a tensile strength of about 160 psi, a modulus M100 of about 8 psi, and a Die B tear strength of about 30 pli, and wherein the polymer material mimicking the esophagus has a tensile strength of about 160 psi, a modulus M100 of about 8 psi, and a Die B tear strength of about 30 pli, and wherein the polymer material mimicking the prevertebral fascia has a tensile strength of about 160 psi, a modulus M100 of about 8 psi, and a Die B tear strength of about 30 pli.

A further understanding of the functional and advantageous aspects of the invention can be realized by reference to the following detailed description and drawings.

BRIEF DESCRIPTION OF THE DRAWINGS

Embodiments will now be described, by way of example only, with reference to the drawings, in which:

FIG. 1A is a coronal or top view of the base substrate (10) configured to fit on the neck of a patient simulator or mannequin.

FIG. 1B shows a sagittal or side view of the base substrate of FIG. 1A.

FIG. 1C shows a perspective view of the base substrate of FIG. 1A.

FIG. 6A shows the hyoid bone (34), epiglottis (46), thyroid cartilage (36), cricoid cartilage (38), first tracheal ring (40), remainder of tracheal rings (42), and the recurrent laryngeal nerves (52).

FIG. 6B shows the anatomy from FIG. 6A with the addition of the cricothyroid muscles (70) and the thyroid gland (54).

FIG. 6C shows the anatomy from FIG. 6B with the addition of the muscle layer which includes the sternocleidomastoideole (80), sternohyoid muscle (78), sternothyroid muscle (76) and omohyoid muscle (74).

FIG. 6D shows the anatomy of FIG. 6C with the addition of the anterior jugular vein (66), external jugular vein (64), internal jugular vein (62) and carotid artery (60).

FIG. 6E shows both sides of the anatomical structures introduced in FIGS. 6C and 6D.

FIG. 6F shows the anatomy of FIG. 6E with the addition of the lymph node layer (90).

FIG. 6G shows the anatomy of FIG. 6F with the addition of the fat layer (92).

FIG. 6H shows the anatomy of FIG. 6G with the addition of the skin layer (94).

FIG. 7A is a coronal or top view of the base substrate (10) with neck anatomy assembled thereon.

FIG. 7B shows a sagittal or side view of the base substrate (10) with neck anatomy assembled thereon.

FIG. 7C shows a perspective view of the base substrate (10) with neck anatomy assembled thereon.

DETAILED DESCRIPTION

Figure 1A:
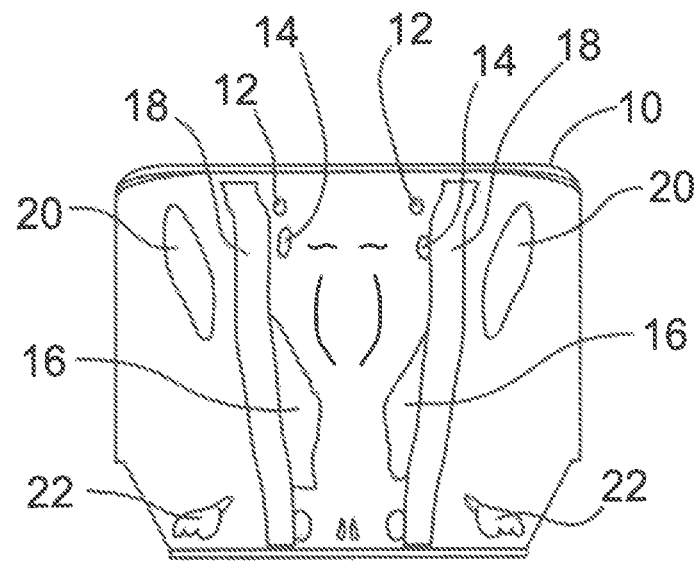
FIGS. 1A to 1C show a design for the base of the simulator, in which the coronal view or top view shows the grooves/landmarks for accurately positioning and anchoring anatomical structures.

Without limitation, the majority of the systems described herein are directed to a neck simulator for simulating the human neck and method of using the same. As required, embodiments of the present invention are disclosed herein. However, the disclosed embodiments are merely exemplary, and it should be understood that the invention may be embodied in many various and alternative forms.

The accompanying figures, which are not necessarily drawn to scale, and which are incorporated into and form a part of the instant specification, illustrate several aspects and embodiments of the present disclosure and, together with the description therein, serve to explain the principles of the simulation apparatus. The drawings are provided only for the purpose of illustrating select embodiments of the apparatus and as an aid to understanding and are not to be construed as a definition of the limits of the present disclosure. For purposes of teaching and not limitation, the illustrated embodiments are directed to surgical and procedural simulation apparatus and method of using the same.

As used herein, the term "about", when used in conjunction with ranges of dimensions, temperatures or other physical properties or characteristics is meant to cover slight variations that may exist in the upper and lower limits of the ranges of dimensions so as not to exclude embodiments where on average most of the dimensions are satisfied but where statistically dimensions may exist outside this region. For example, in embodiments of the present invention dimensions, composition, and characteristics of components of a neck simulator may be given but it will be understood that these are not meant to be limiting.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

In various aspects, embodiments of this disclosure relate to surgical and procedural simulators and, more particularly, to simulators for learning or practicing surgery and procedures involving the neck and airway and methods of use thereof.

According to one aspect, there is provided a simulator for practicing surgery or procedures of the neck and airway, comprising a simulated layer of skin, a simulated layer of fat, simulated lymph nodes, simulated neck muscles, simulated blood vessels including veins and arteries with colored fluid within that may be connected to a pump device to simulate blood flow through the vessels, a simulated thyroid gland, simulated parathyroid glands, a simulated airway with a simulated hyoid bone, simulated thyroid cartilage, simulated cricoid cartilage, simulated tracheal rings, simulated epiglottis, simulated arytenoid cartilages, simulated mucosa, simulated recurrent laryngeal nerves, simulated trachealis muscle, a simulated esophagus and simulated prevertebral fascia. Table 1 below provides a legend linking the reference numerals to the anatomical part they represent.

TABLE 1

| Anatomical Part | Reference Number |
| --- | --- |
| base substrate | 10 |
| landmark 1 | 12 |
| landmark 2 | 14 |
| landmark 3 | 16 |
| landmark 4 | 18 |
| landmark 5 | 20 |
| landmark 6 | 22 |
| prevertebral fascia | 30 |
| esophagus | 32 |
| hyoid bone | 34 |
| thyroid cartilage | 36 |
| cricoid cartilage | 38 |
| $1^{st}$ tracheal ring | 40 |
| tracheal rings | 42 |
| trachealis muscle | 44 |
| epiglottis | 46 |
| arytenoid cartilages | 48 |
| mucosa | 50 |
| recurrent laryngeal nerves | 52 |
| thyroid gland | 54 |
| parathyroid glands | 56 |
| carotid arteries | 60 |
| internal jugular veins | 62 |
| external jugular veins | 64 |
| anterior jugular veins | 66 |
| cricothyroid muscles | 70 |
| thyrohyoid muscles | 72 |
| omohyoid muscles | 74 |
| sternothyroid muscles | 76 |
| sternohyoid muscles | 78 |
| sternocleidomastoid muscles | 80 |
| lymph nodes | 90 |
| fat | 92 |
| skin | 94 |

Figure 1B:
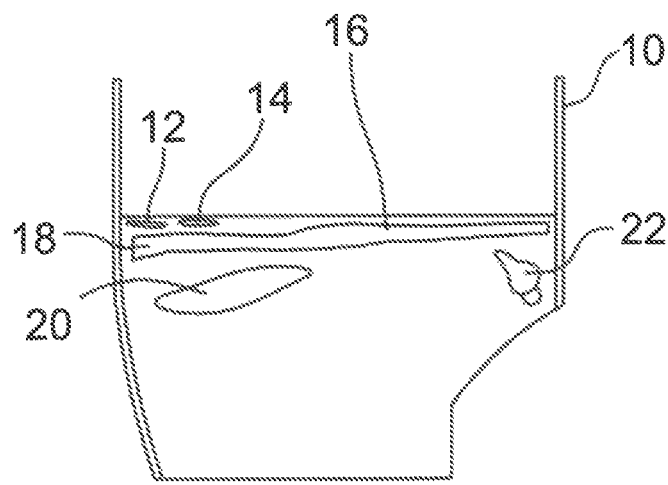
Figure 1C:
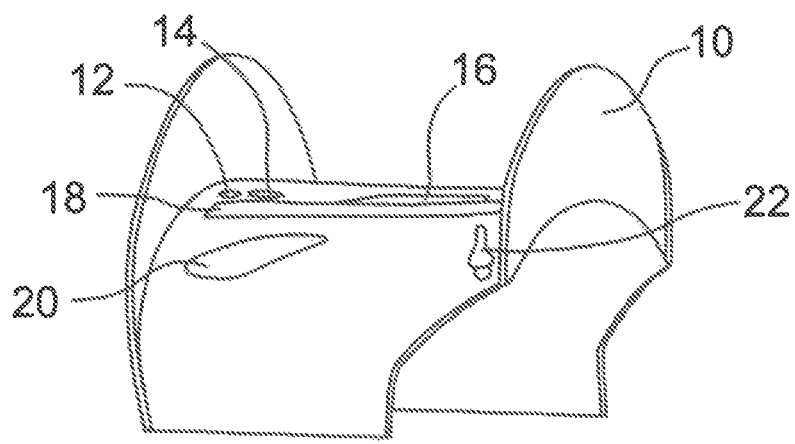

Referring to FIGS. 1A to 1C, a rigid base substrate (10) provides the substrate on which the tissue mimics are layered. The base (10) may be produced from a rigid material such as, but not limited to, polyvinyl chloride (PVC), polylactic acid, acrylonitrile butadiene styrene plastic, polyurethane plastics, other rigid plastics, ceramic or metal. In some embodiments, the base (10) can be casted with liquid resins or 3D printed using techniques such as extrusion, light polymerization, binder/powder jetting or lamination technique. In some embodiments, the base (10) may have one or more holes or openings of variable size to access the airway.

The base substrate (10) allows for easy and reproducible assembly of the anatomical structures and layers. Landmarks, which are shallow grooves or indentations on the surface of the base (10) are used to identify where the tissue mimic structures are to be anchored to mimic the human neck and airway. As noted above, the landmarks can be grooves or indentations and in an embodiment may have a depth ranging from 0.3 mm to 1 mm) or alternatively they may be raised outlines (with a height ranging from 0.3 mm to 1 mm) on the surface of the base (10). The hyoid bone, laryngeal cartilage structures, trachea, carotid arteries, internal jugular veins and sections of the lymph node layer may be first anchored to the base (10), followed by the thyroid gland. The muscles are then laid over top and anchored to their landmarks on the base (10). The anterior and external jugular veins are laid on top of the muscle layer. A lymph node layer, followed by the fat and skin layers are then laid down.

The above noted ranges are based on the thickness of the base (10) which in this embodiment is 2 mm thick, so the depth of the grooves need to be small (under 1 mm). If a base (10) is used which is thicker, then larger depths of the grooves or indentations or raised outlines are permissible. The various anatomical mimic tissue structures may be attached to each other and to the base using a polymer or adhesive (such as cyanoacrylate containing adhesives), or by mechanical fasteners (such as screws, nails, pins or clamps).

FIGS. 1A to 1C show landmark 1 (12), landmark 2 (14), landmark 3 (16), landmark 4 (18), landmark 5 (20), and landmark 6 (22). The hyoid bone (34) is attached to landmark 1 (12), thyroid cartilage (36) is attached to landmark 2 (14), the thyroid gland (54) is attached to landmark 3 (16), the carotid arteries (60) are attached to landmark 4 (18), the sternocleidomastoid muscles (80) are attached to landmark 5 (20) and the lymph node layer (90) is attached to landmark 6 (22).

Figure 2A:
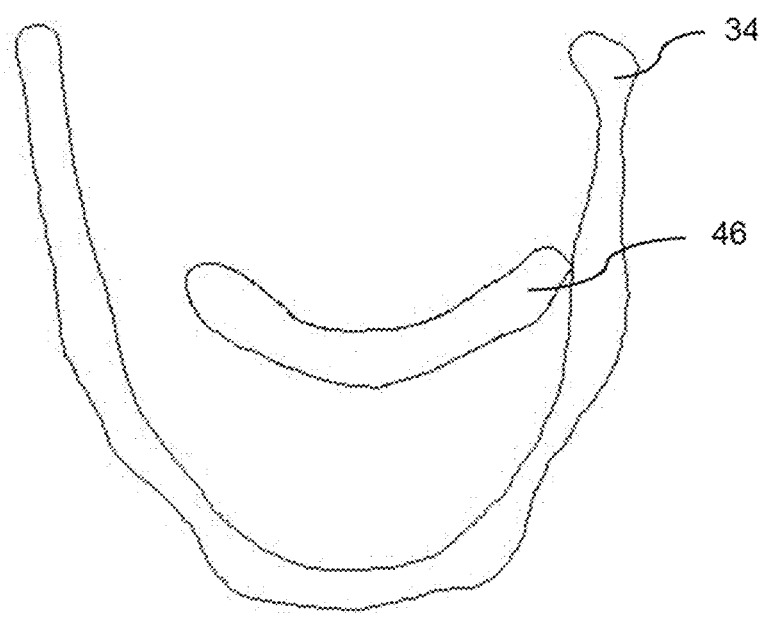
FIGS. 2A to 2F show the anatomical structures in axial planes in which images in FIGS. 2A through 2F begin at the level of the hyoid bone and travel inferiorly such that the image in FIG. 2A shows the hyoid bone (34) and epiglottis (46), images in FIGS. 2B to 2E show the thyroid cartilage (36), arytenoid cartilages (48), cricoid cartilage (38) and mucosa (50) respectively and the image in FIG. 2F shows the first cartilaginous tracheal ring (40), trachealis muscle (44) and mucosa (50).
Figure 2B:
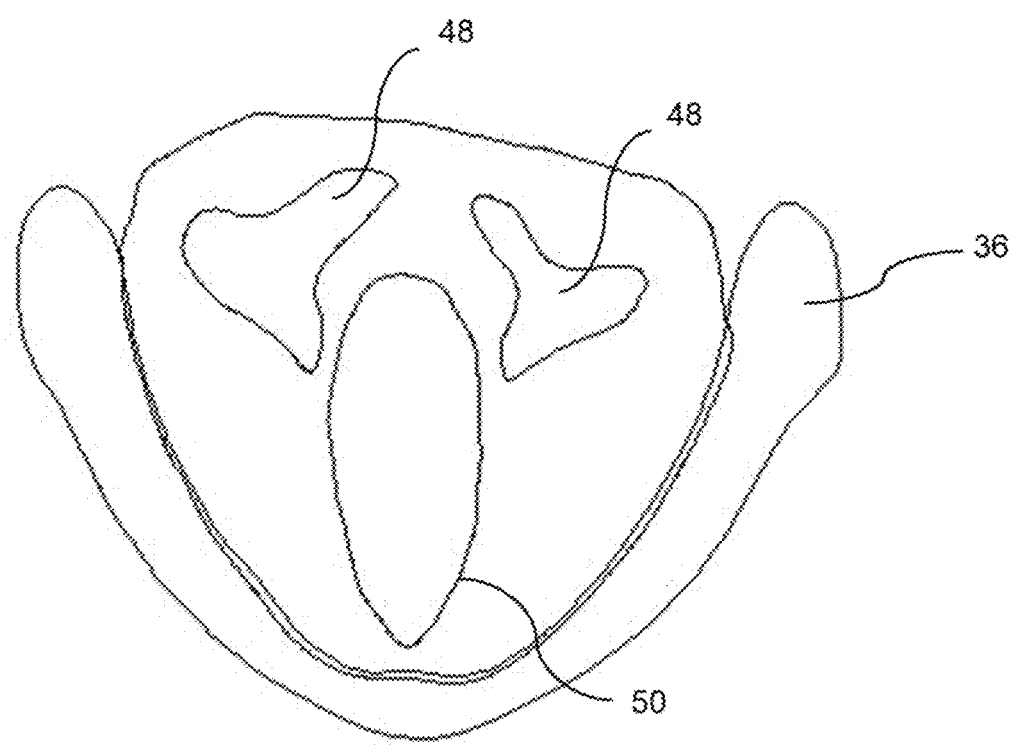
Figure 2C:
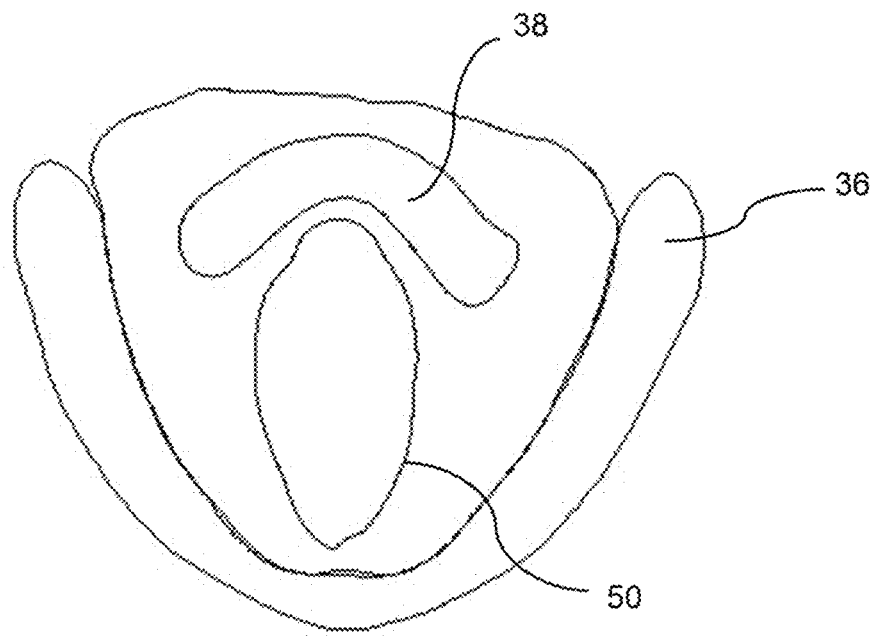
Figure 2D:
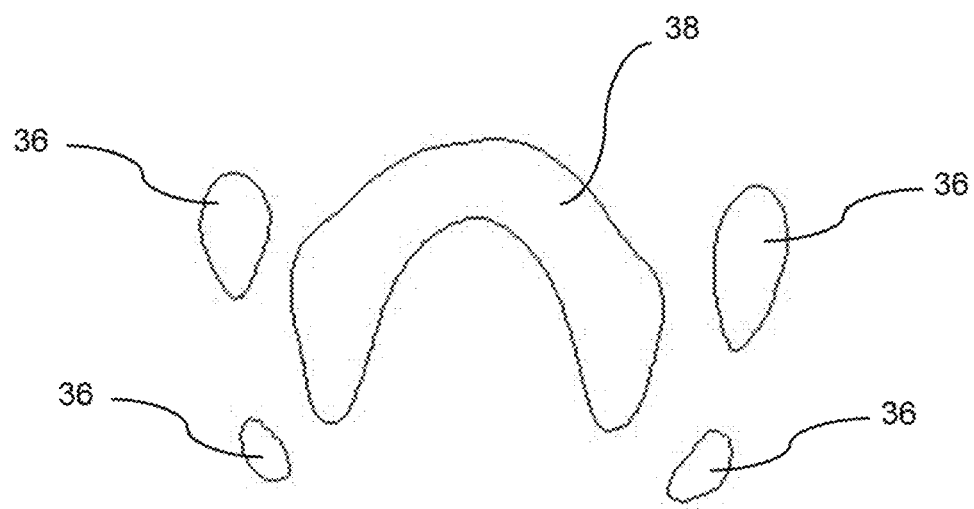
Figure 2E:
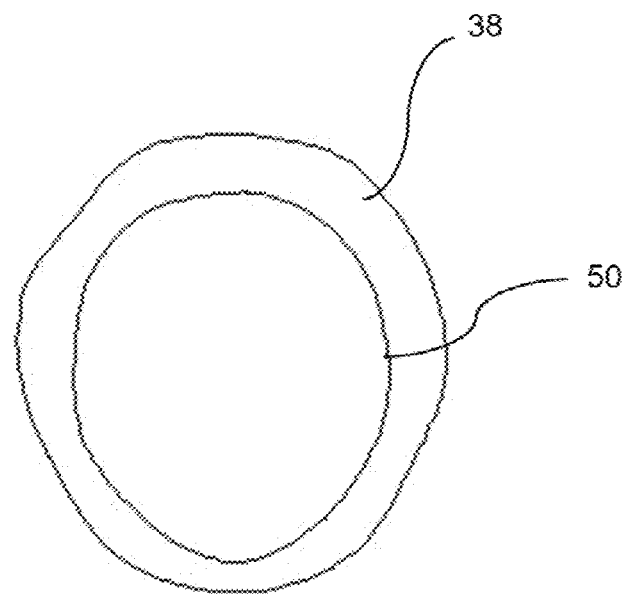
Figure 2F:
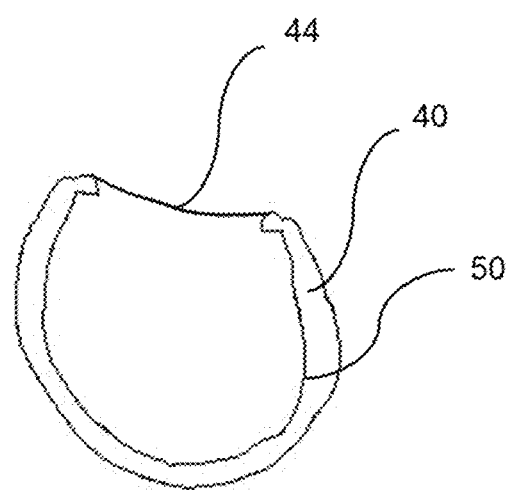

FIGS. 2A to 6H show the tissues, vessels, structural components making up the human neck. Specifically, FIGS. 2A to 2F show the anatomical structures in axial planes in which images in FIGS. 2A through 2F begin at the level of the hyoid bone and travel inferiorly such that the image in FIG. 2A shows the hyoid bone (34) and epiglottis (46), images in FIGS. 2B to 2E show the thyroid cartilage (36), arytenoid cartilages (48), cricoid cartilage (38), and mucosa (50) respectively and the image in FIG. 2F shows the first cartilaginous tracheal ring (40), trachealis muscle (44) and mucosa (50).

Figure 3:
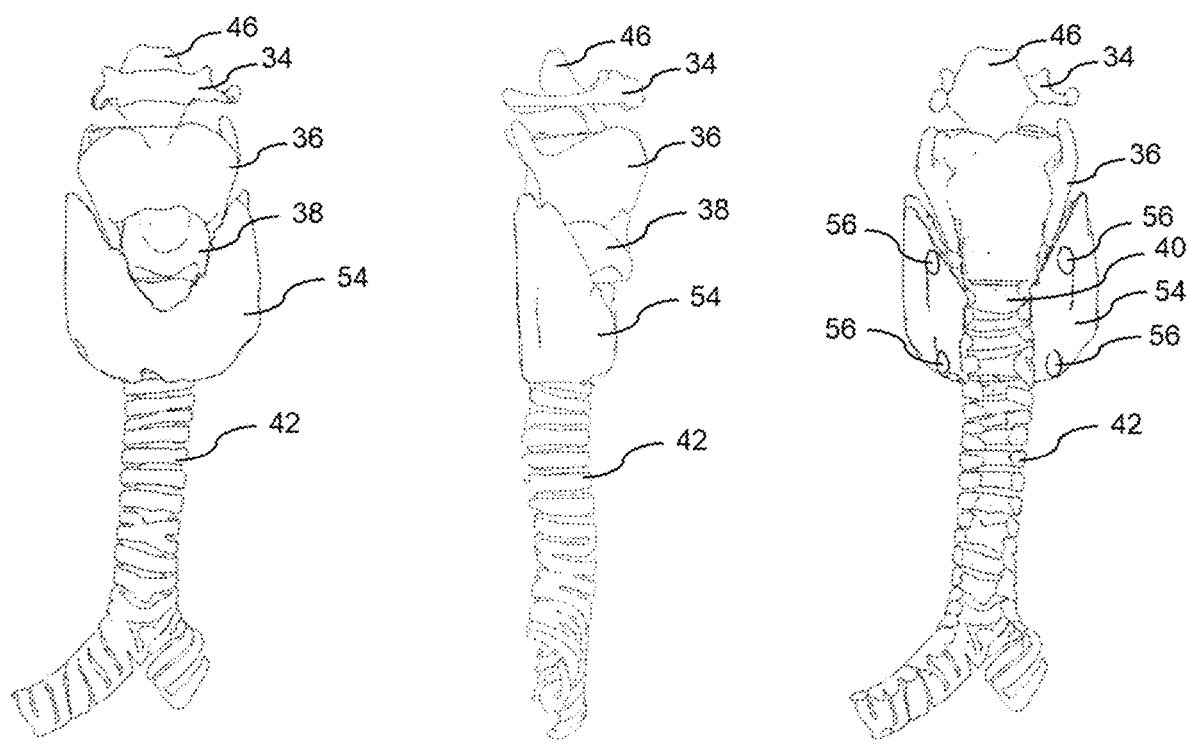
FIG. 3 shows the anatomical structures in coronal plane from anteriorly (left most view), coronal plane from posteriorly (right most view) and sagittal plane (middle view) including the hyoid bone (34), epiglottis (46), thyroid cartilage (36), cricoid cartilage (38), thyroid gland (54), parathyroid glands (56) and tracheal rings (42) which include the first tracheal ring (40). The left most view is looking at the anatomy from the front, the middle view is looking at the anatomy from the right side, and the right most view is looking at the anatomy from the back.

FIG. 3 shows the anatomical structures in coronal plane from anteriorly (left most view), coronal plane from posteriorly (right most view) and sagittal plane (middle view) including the hyoid bone (34), epiglottis (46), thyroid cartilage (36), cricoid cartilage (38), thyroid gland (54), parathyroid glands (56) and tracheal rings (42) which include the first tracheal ring (40). The left most view is looking at the anatomy from the front, the middle view is looking at the anatomy from the right side, and the right most view is looking at the anatomy from the back.

Figure 4A:
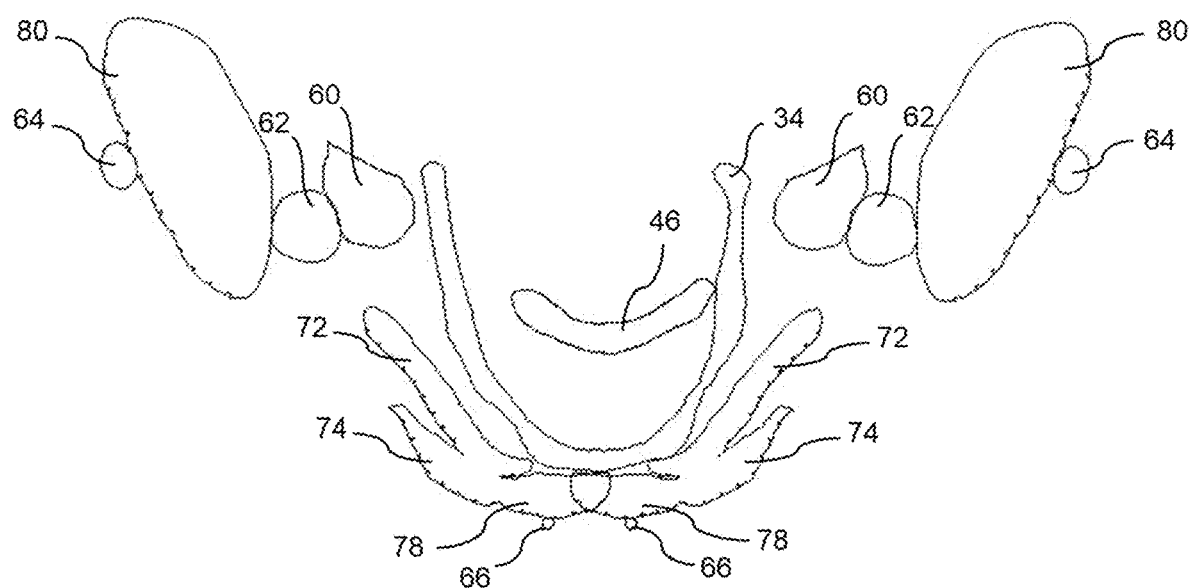
FIGS. 4A to 4C show the anatomical structures in axial planes. Images from top to bottom begin at the level of the hyoid bone and travel inferiorly. Anatomical structures include the hyoid bone (34), epiglottis (46), thyroid cartilage (36), arytenoid cartilages (48), mucosa (50), tracheal rings (42), trachealis muscle (44), esophagus (32), prevertebral fascia (30), thyroid gland (54), sternocleidomastoideoles (80), sternohyoid muscles (78), sternothyroid muscles (76), omohyoid muscles (74), thyrohyoid muscles (72), anterior jugular veins (66), external jugular veins (64), internal jugular veins (62), and carotid arteries (60).
Figure 4B:
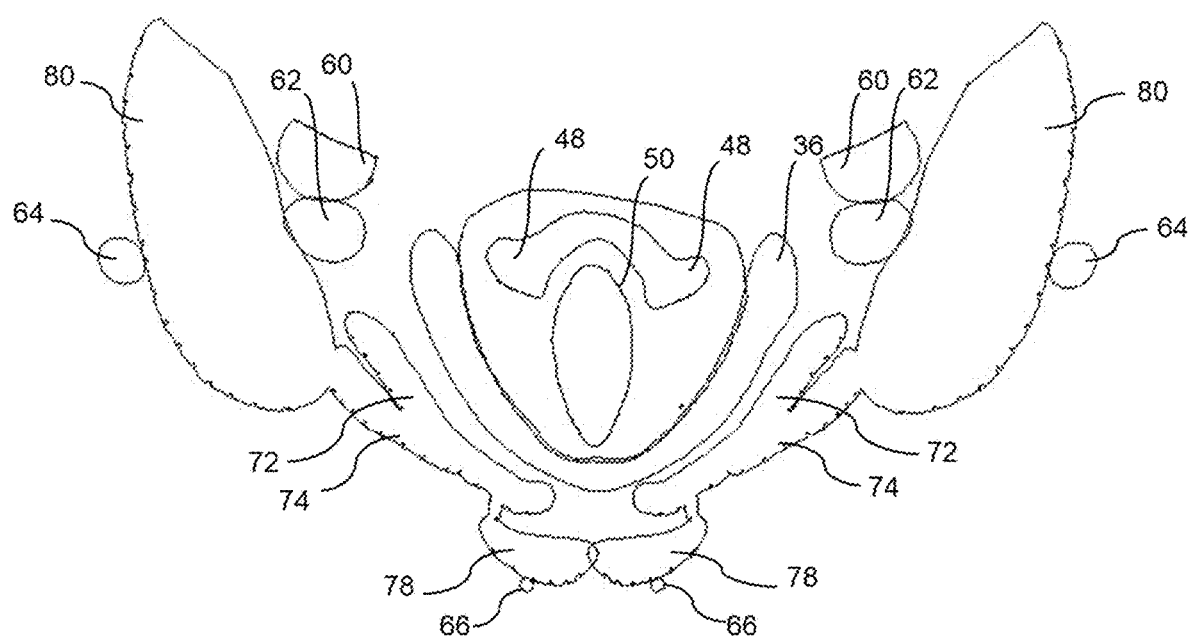
Figure 4C:
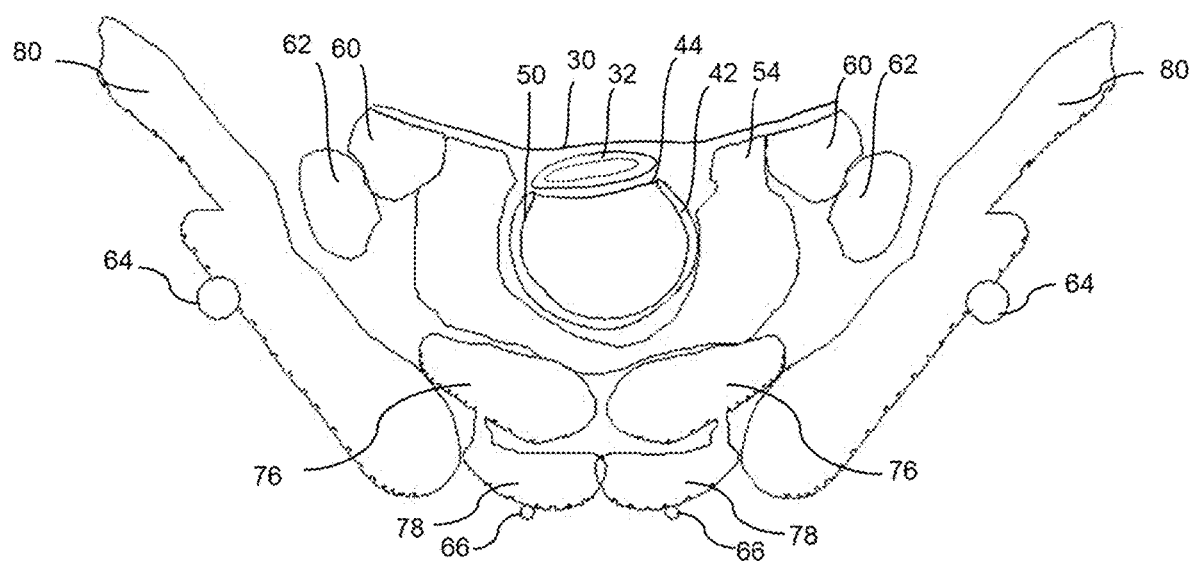

FIGS. 4A to 4C show the anatomical structures in axial planes. Images from top to bottom begin at the level of the hyoid bone and travel inferiorly. Anatomical structures include hyoid bone (34), epiglottis (46), thyroid cartilage (36), arytenoid cartilages (48), mucosa (50), tracheal rings (42), trachealis muscle (44), esophagus (32), prevertebral fascia (30), thyroid gland (54), sternocleidomastoideoles (80), sternohyoid muscles (78), sternothyroid muscles (76), omohyoid muscles (74), thyrohyoid muscles (72), anterior jugular veins (66), external jugular veins (64), internal jugular veins (62) and carotid arteries (60).

Figure 5:
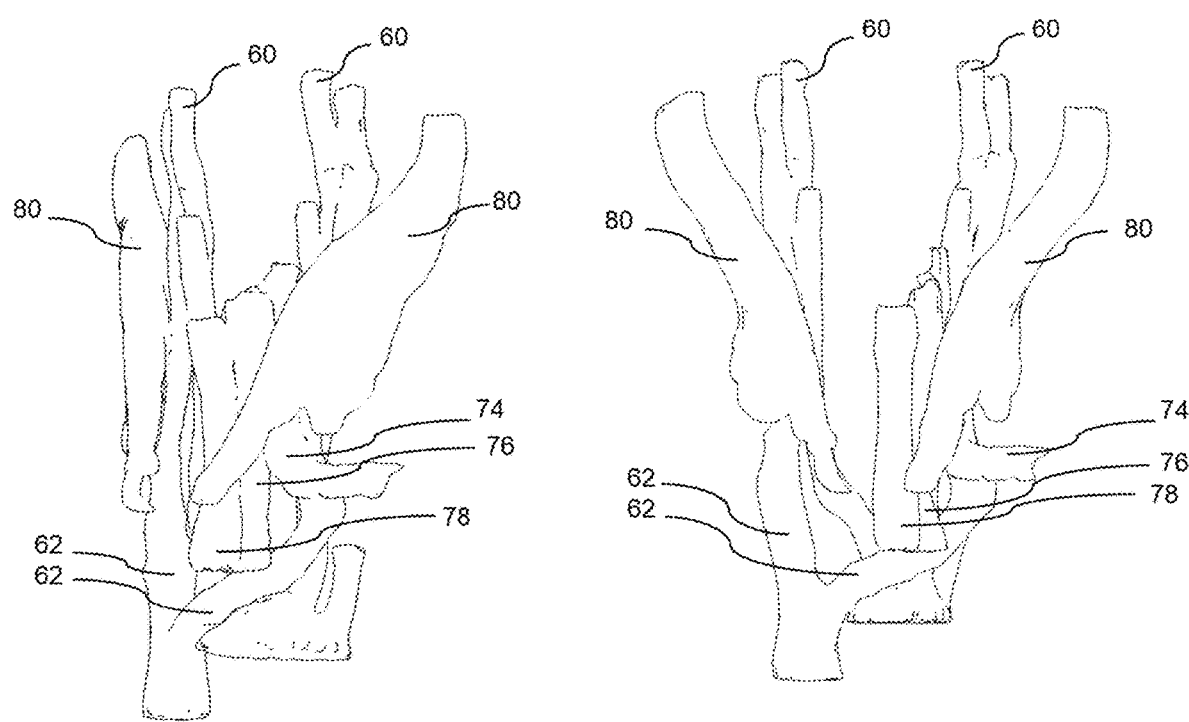
FIG. 5 shows the anatomical structures in sagittal view from the left (left image) and coronal view (right image) including sternocleidomastoid muscles (80), infrahyoid muscles (visualized are the left sternohyoid muscle (78), left sternothyroid muscle (76), left omohyoid muscle (74) and thyrohyoid muscle (72) is not visualized in FIG. 4), carotid arteries (60) and internal jugular veins (62).

FIG. 5 shows the anatomical structures in sagittal view from the left (left image) and coronal view (right image) including sternocleidomastoid muscles (80), infrahyoid muscles (visualized are the left sternohyoid muscle (78), left sternothyroid muscle (76), left omohyoid muscle (74) and thyrohyoid muscle (72) is not visualized in FIG. 4), carotid arteries (60) and internal jugular veins (62).

Figure 6A:
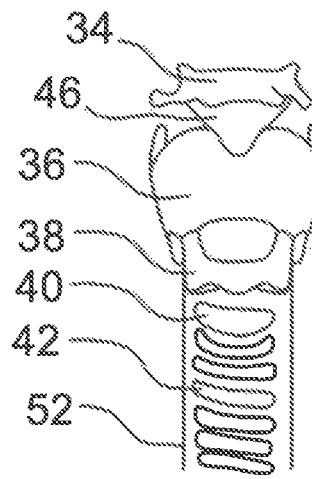
FIGS. 6A to 6H show the anatomical structures of the simulator serially.
Figure 6B:
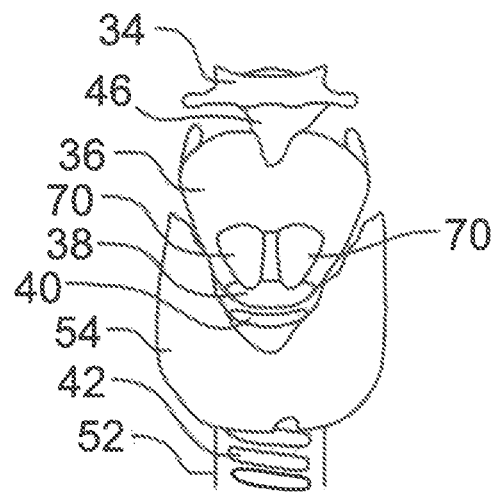
Figure 6C:
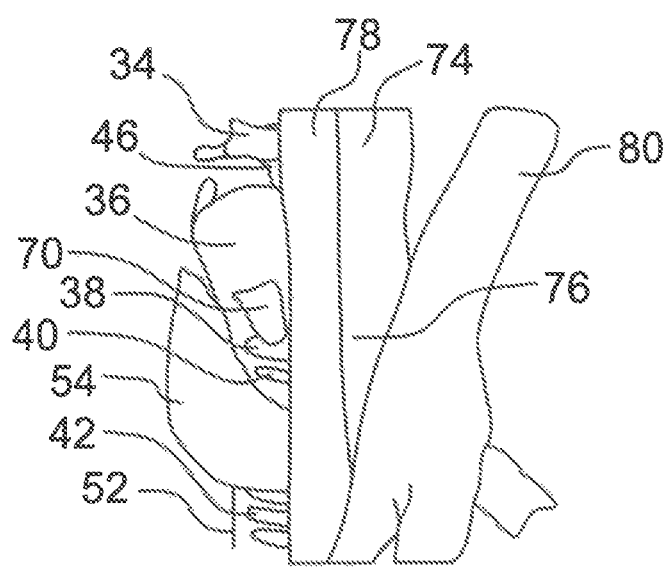
Figure 6D:
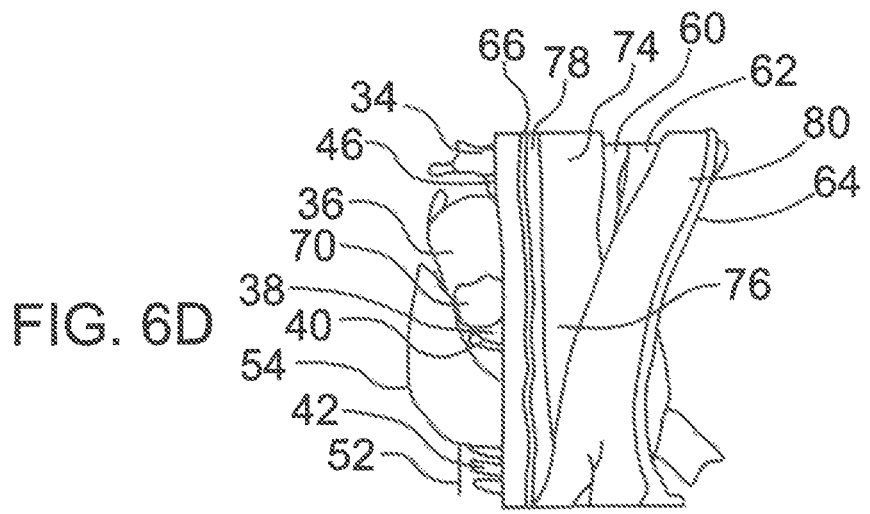
Figure 6E:
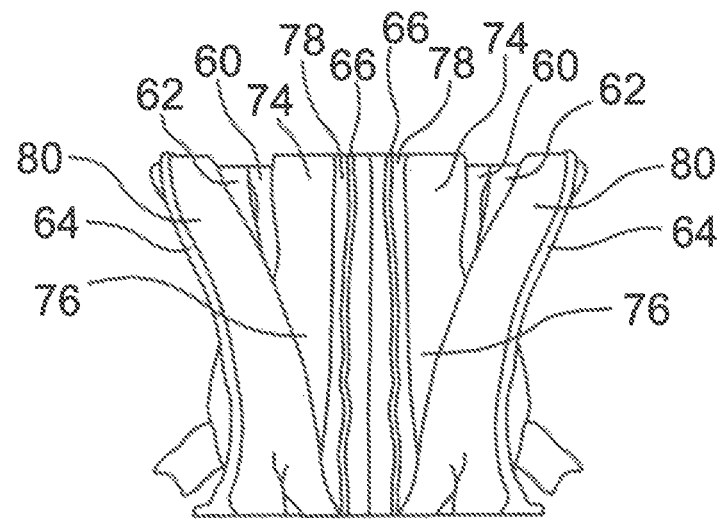
Figure 6F:
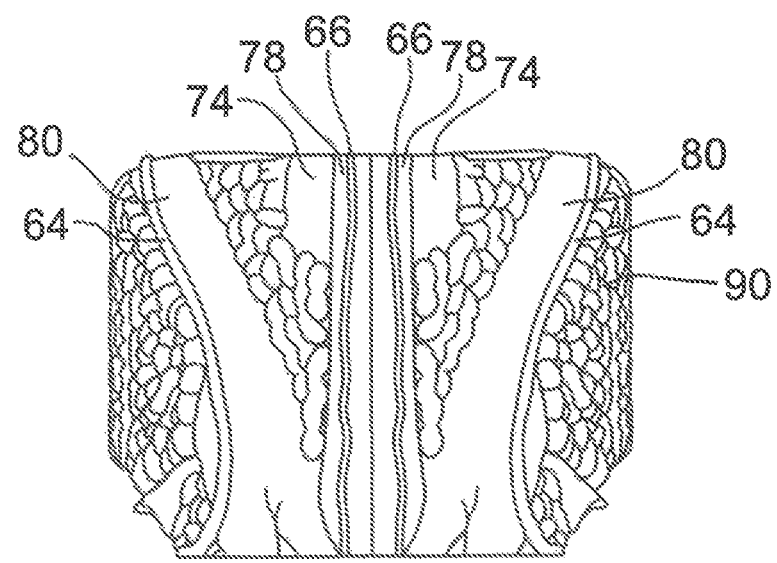
Figure 6G:
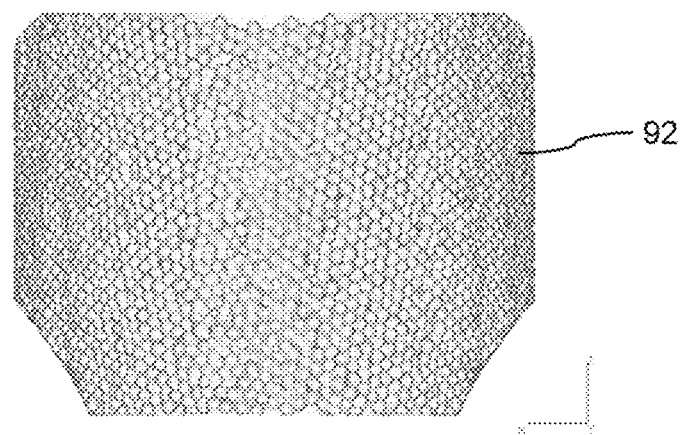
Figure 6H:
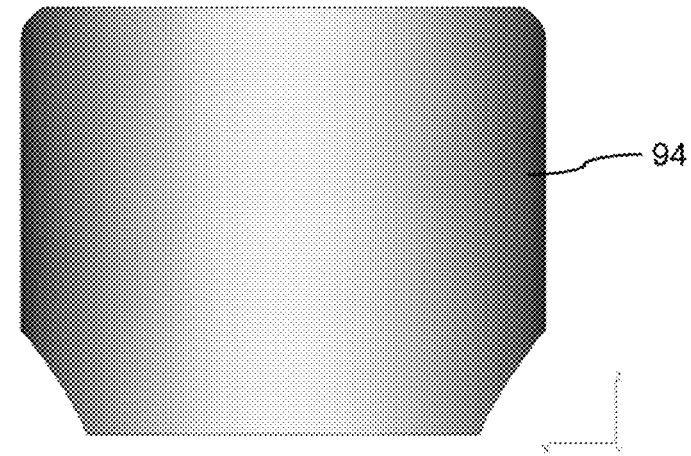

FIGS. 6A to 6H show the anatomical structures of the simulator serially. FIG. 6A shows the hyoid bone (34), epiglottis (46), thyroid cartilage (36), cricoid cartilage (38), first tracheal ring (40), remainder of tracheal rings (42), and the recurrent laryngeal nerves (52). FIG. 6B shows the anatomy from FIG. 6A with the addition of the cricothyroid muscles (70) and the thyroid gland (54) while FIG. 6C shows the anatomy from FIG. 6B with the addition of the muscle layer which includes the sternocleidomastoideole (80), sternohyoid muscle (78), sternothyroid muscle (76) and omohyoid muscle (74). FIG. 6D shows the anatomy of FIG. 6C with the addition of the anterior jugular vein (66), external jugular vein (64), internal jugular vein (62) and carotid artery (60), and FIG. 6E shows both sides of the anatomical structures introduced in FIGS. 6C and 6D. FIG. 6F shows the anatomy of FIG. 6E with the addition of the lymph node layer (90). FIG. 6G shows the anatomy of FIG. 6F with the addition of the fat layer (92). FIG. 6H shows the anatomy of FIG. 6G with the addition of the skin layer (94).

Figure 7A:
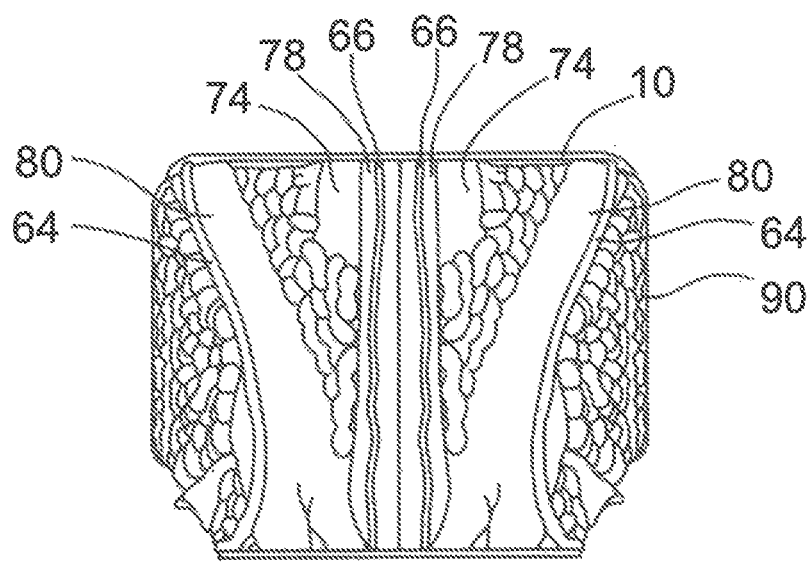
FIGS. 7A to 7C show the base of the simulator with neck anatomy assembled thereon.
Figure 7B:
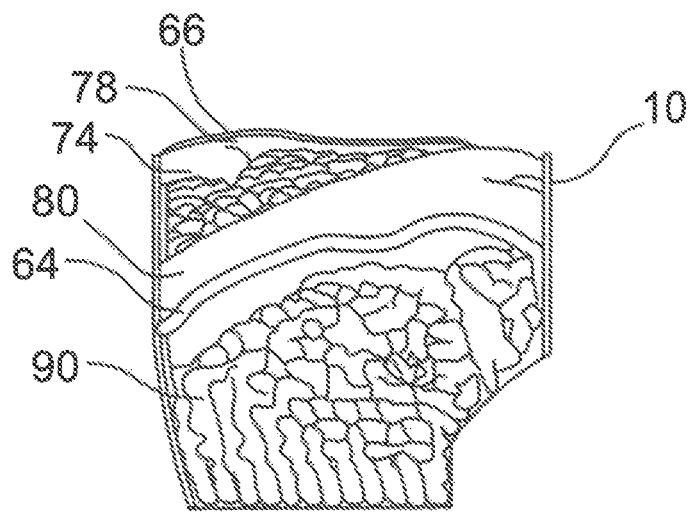
Figure 7C:
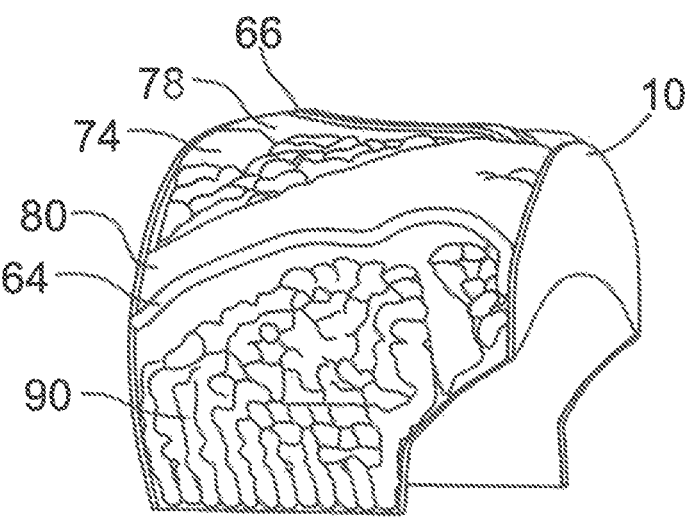

FIGS. 7A to 7C show the base of the simulator with neck anatomy assembled thereon. FIG. 7A is a coronal or top view of the base substrate (10) with neck anatomy assembled thereon. FIG. 7B shows a sagittal or side view of the base substrate (10) with neck anatomy assembled thereon. FIG. 7C shows a perspective view of the base substrate (10) with neck anatomy assembled thereon.

Figure 8A:
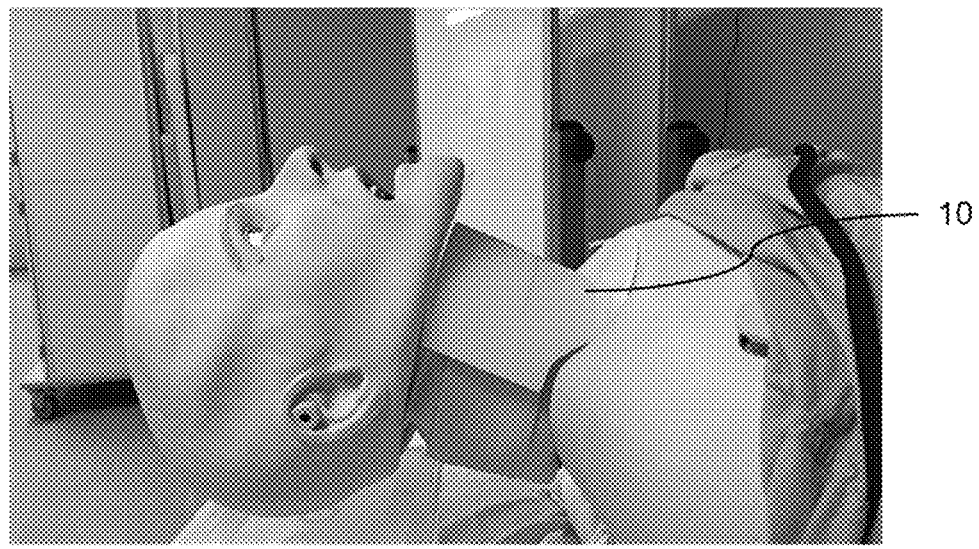
FIG. 8A is a photograph of a sagittal or side view showing that the base fits seamlessly on the neck of Laerdal's® SimMan® 3G (model 2017).
Figure 8B:
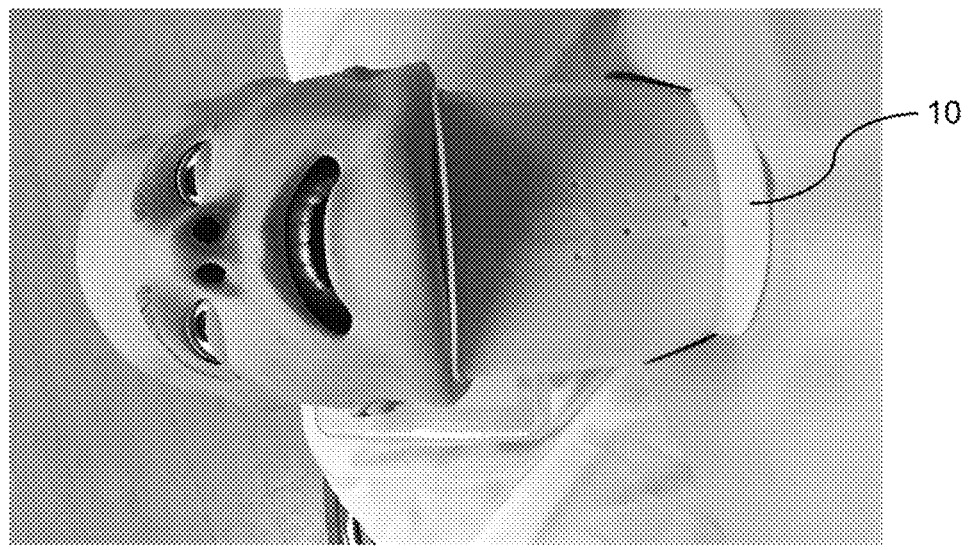
FIG. 8B is a photograph of a coronal or top view of FIG. 8A.
Figure 9A:
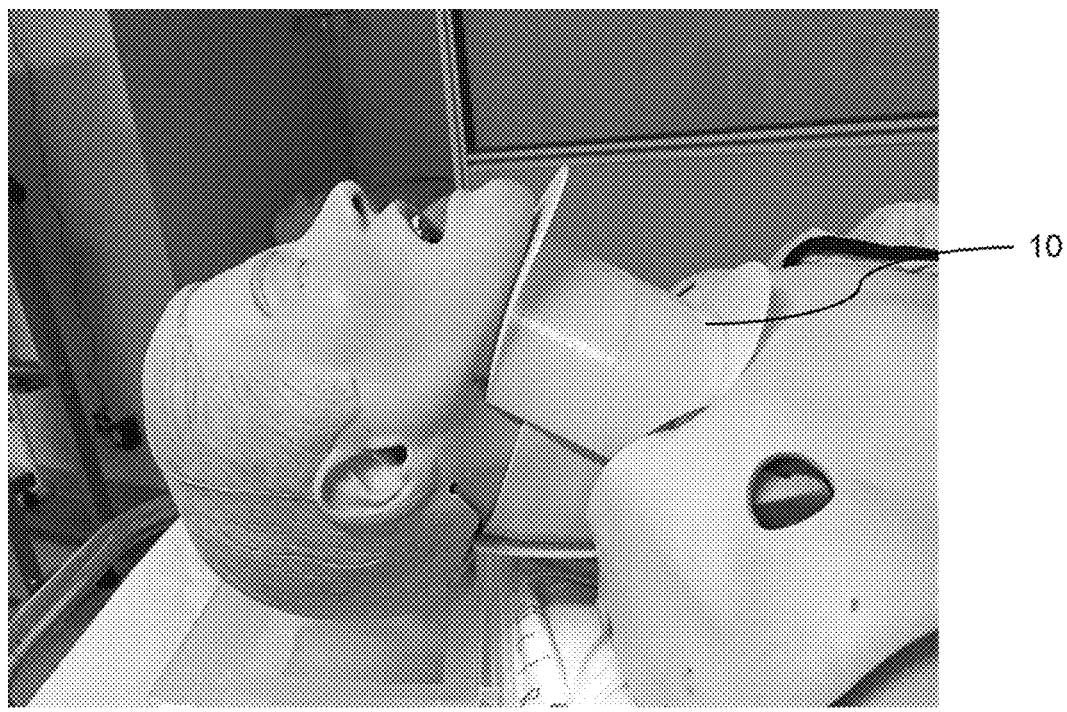
FIGS. 9A and 9B are photographs similar to FIGS. 8A and 8B showing that the base fits on other adult simulators including Laerdal's® SimMan® Classic.
Figure 9B:
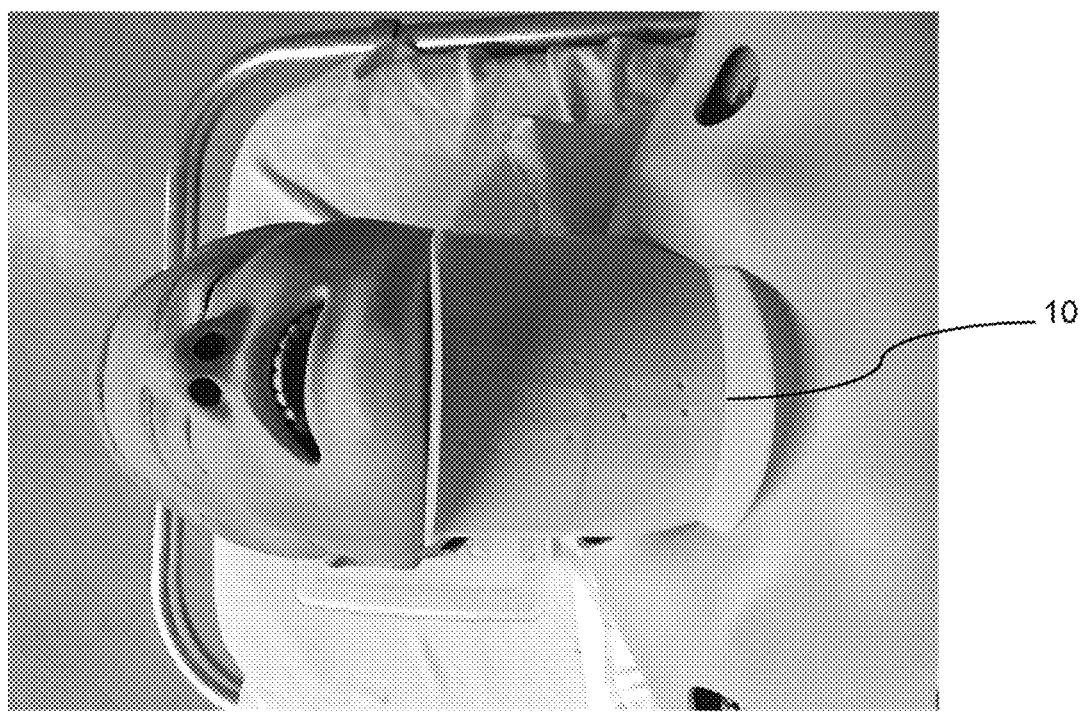
Figure 10A:
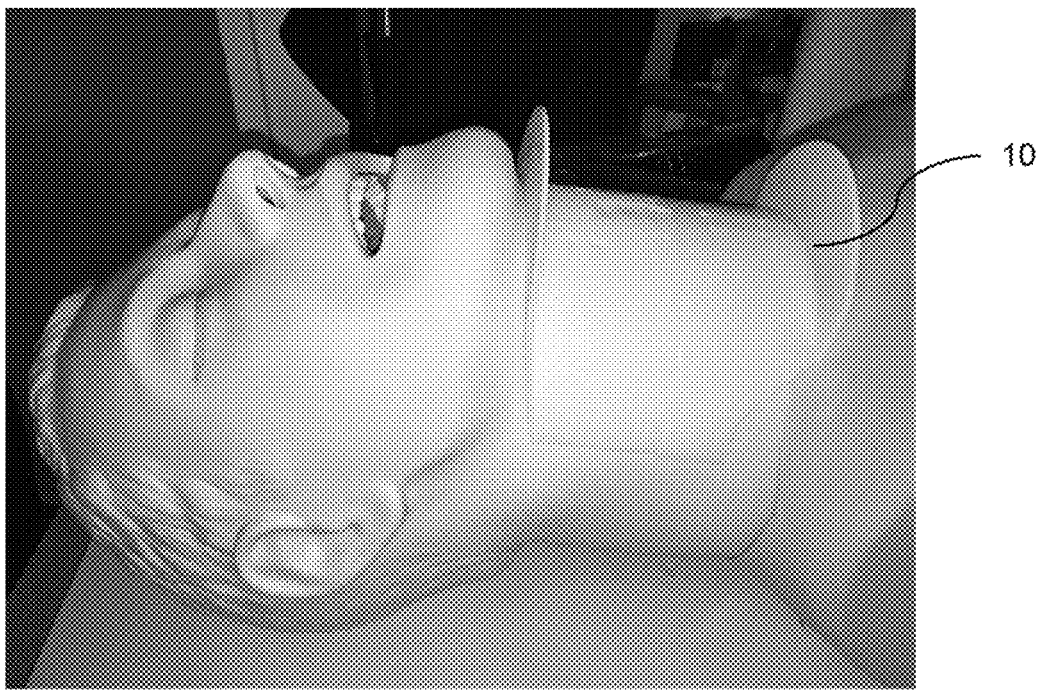
FIGS. 10A and 10B are photographs similar to FIGS. 8A and 8B showing that the base fits on the Laerdal's® Airway Management Trainer.
Figure 10B:
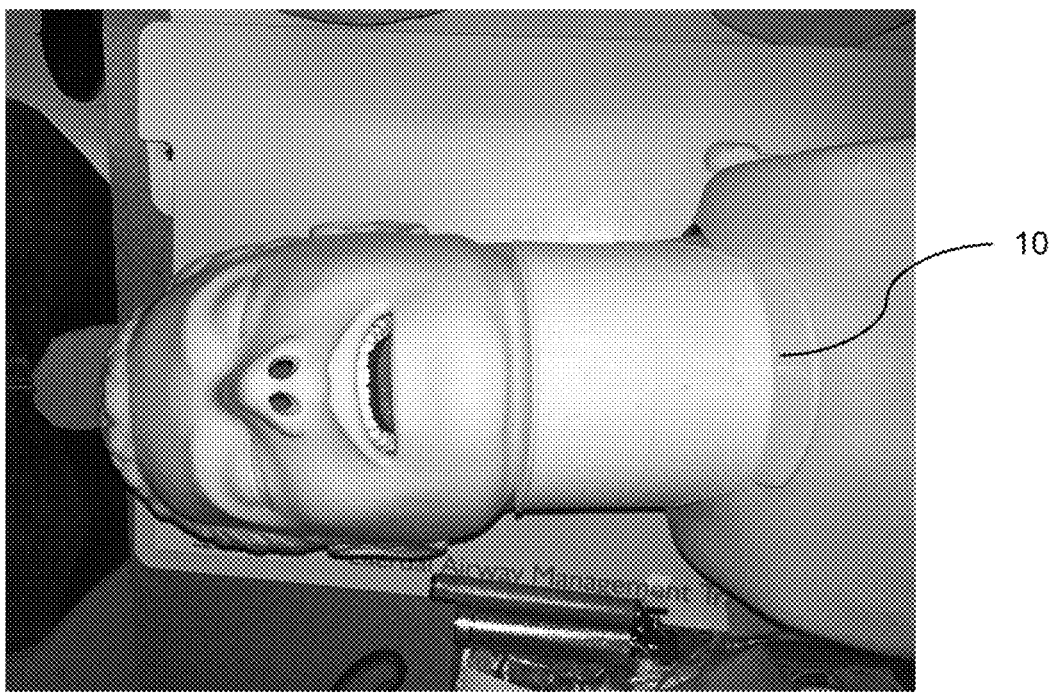

FIGS. 8A to 10B show photographs of the base demonstrating that it fits seamlessly on the neck of various commercially available mannequins. FIG. 8A is a photograph of a sagittal or side view showing that the base fits seamlessly on the neck of Laerdal's® SimMan® 3G (model 2017). FIG. 8B is a photograph of a coronal or top view of FIG. 8A. FIGS. 9A and 9B are photographs similar to FIGS. 8A and 8B showing that the base fits on other adult simulators including Laerdal's® SimMan® Classic. FIGS. 10A and 10B are photographs similar to FIGS. 8A and 8B showing that the base fits on Laerdal's® Airway Management Trainer.

Table 2 below shows preferred polymer materials to produce the various tissue mimics from and their broad ranges of tensile strength, modulus (M100) and Die B Tear Strength.

TABLE 2

| Anatomical structure/tissue layer | Material (from Smooth-On https://www.smooth-on.com/products) | Polymer | Tensile Strength | Modulus (M100) | Die B Tear Strength |
|---|---|---|---|---|---|
| Skin | DragonSkin ™ 20 | Silicone | 550 psi | 49 psi | 120 pli |
| | | | 100-650 psi | 5-150 psi | 10-200 pli |
| | | | 150-600 psi | 15-100 psi | 60-150 pli |
| | | | 530-570 psi | 30-70 psi | 100-140 pli |
| Fat | EcoFlex ™ GEL | Silicone | 100 psi | 5 psi | 24 pli |
| | | | 10-600 psi | 1-100 psi | 10-150 pli |
| | | | 20-550 psi | 2-50 psi | 15-100 pli |
| | | | 80-120 psi | 3-25 psi | 20-44 pli |
| Lymph Nodes | EcoFlex ™ GEL | Silicone | 100 psi | 5 psi | 24 pli |
| | | | 10-600 psi | 1-100 psi | 10-150 pli |
| | | | 20-550 psi | 2-50 psi | 15-100 pli |
| | | | 80-120 psi | 3-25 psi | 20-44 pli |
| Muscles (sternocleidomastoid muscles, sternohyoid muscles, sternothyroid muscles, omohyoid muscles, thyrohyoid muscles, cricothyroid muscles, trachealis muscle) | Ecoflex ™ 00-20 | Silicone | 160 psi | 8 psi | 30 pli |
| | | | 50-600 psi | 2-135 psi | 10-170 pli |
| | | | 100-550 psi | 3-85 psi | 15-120 pli |
| | | | 140-180 psi | 5-28 psi | 20-50 pli |
| Blood vessels (jugular veins, carotid arteries) | Ecoflex ™ 00-20 | Silicone | 160 psi | 8 psi | 30 pli |
| | | | 50-600 psi | 2-135 psi | 10-170 pli |
| | | | 100-550 psi | 3-85 psi | 15-120 pli |
| | | | 140-180 psi | 5-28 psi | 20-50 pli |
| Thyroid Gland | Ecoflex ™ 00-20 | Silicone | 160 psi | 8 psi | 30 pli |
| | | | 50-600 psi | 2-135 psi | 10-170 pli |
| | | | 100-550 psi | 3-85 psi | 15-120 pli |
| | | | 140-180 psi | 5-28 psi | 20-50 pli |
| Parathyroid Glands | Ecoflex ™ 00-20 | Silicone | 160 psi | 8 psi | 30 pli |
| | | | 50-600 psi | 2-135 psi | 10-170 pli |
| | | | 100-550 psi | 3-85 psi | 15-120 pli |
| | | | 140-180 psi | 5-28 psi | 20-50 pli |
| Laryngeal and tracheal cartilages (hyoid bone, thyroid cartilage, cricoid cartilage, tracheal rings, epiglottis, arytenoid cartilages) | VytaFlex ™ 60 + corn starch (additive) | Polyurethane + corn starch | 880 psi | 300 psi | 136 pli |
| | | | 100-1000 psi | 10-450 psi | 50-250 pli |
| | | | 150-950 psi | 60-400 psi | 100-200 pli |
| | | | 860-900 psi | 280-320 psi | 120-160 pli |
| Mucosa | Ecoflex ™ 00-20 | Silicone | 160 psi | 8 psi | 30 pli |
| | | | 50-600 psi | 2-135 psi | 10-170 pli |
| | | | 100-550 psi | 3-85 psi | 15-120 pli |
| | | | 140-180 psi | 5-28 psi | 20-50 pli |
| Recurrent laryngeal nerves | Ecoflex ™ 00-20 | Silicone | 160 psi | 8 psi | 30 pli |
| | | | 50-600 psi | 2-135 psi | 10-170 pli |
| | | | 100-550 psi | 3-85 psi | 15-120 pli |
| | | | 140-180 psi | 5-28 psi | 20-50 pli |
| Esophagus | Ecoflex ™ 00-20 | Silicone | 160 psi | 8 psi | 30 pli |
| | | | 50-600 psi | 2-135 psi | 10-170 pli |
| | | | 100-550 psi | 3-85 psi | 15-120 pli |
| | | | 140-180 psi | 5-28 psi | 20-50 pli |
| Prevertebral fascia | Ecoflex ™ 00-20 | Silicone | 160 psi | 8 psi | 30 pli |
| | | | 50-600 psi | 2-135 psi | 10-170 pli |
| | | | 100-550 psi | 3-85 psi | 15-120 pli |
| | | | 140-180 psi | 5-28 psi | 20-50 pli |

The bolded values in Table 2 are the preferred properties of the current simulator. The materials listed in Table 2 are simply examples and are non-limiting, and the inventors contemplate that any material with these properties may be used. The inventors contemplate that materials within the broadest range of mechanical properties listed may be used, and that materials within each of the narrower ranges of mechanical properties listed may be used as well. It should be appreciated that the materials and ranges of mechanical properties are non-binding and are just exemplary. Powders such as, but not limited to, corn starch, talc powder, polyfiber powder or other powdered substances may be added to polymers to tune their mechanical properties. The inventors prefer the addition of powder for the creation of cartilaginous structures but contemplate that other structures may be modified using powders as well.

The simulated structures of the neck, airway or base may be thicker or thinner, shorter or longer, larger or smaller, softer or harder, darker or lighter, smoother or rougher, to mimic anatomy of different ages, weight, sex or body type.

The simulated structures of the neck and airway may include or be attached to a base or may individually or in combination be incorporated into a different simulator.

The simulated base may include slits, holes, anchors or other fasteners to attach straps, ties, belts, string, thread, or other materials to the base. These straps, ties, belts, string, thread or other materials may be used to secure the base with or without the simulator to another body whether synthetic or real.

The simulator may form a cartridge that replaceably fits within a complete or partially simulated face and/or neck and/or body.

Any part of the simulator may be constructed as a cartridge that replaceably fits within a complete or partially simulated face and/or neck and/or body.

Any part of the simulator may be constructed with a section or part removed. Any section or part that is removed may be viewed through an additional material that may be clear, transparent, semi-transparent, translucent, semi-translucent, opaque, semi-opaque or a mixture of any of these.

A 3D printer may be used to create the simulator or any component thereof.

The simulated skin layer may be attached to the simulated fat layer and a first strength of attachment between the simulated skin layer and the simulated fat layer may differ from a second strength of attachment between the simulated skin layer and the simulated fat layer. The first strength of attachment may be greater or less than the second strength of attachment.

The simulated skin layer may be attached to the simulated vessels and a first strength of attachment between the simulated skin layer and the simulated vessels may differ from a second strength of attachment between the simulated skin layer and the simulated vessels. The first strength of attachment may be greater or less than the second strength of attachment.

The simulated skin layer may be attached to the simulated muscles and a first strength of attachment between the simulated skin layer and the simulated muscle layer may differ from a second strength of attachment between the simulated skin layer and the simulated muscle layer. The first strength of attachment may be greater or less than the second strength of attachment.

The simulated skin layer may be attached to the simulated lymph node layer and a first strength of attachment between the simulated skin layer and the simulated lymph node layer may differ from a second strength of attachment between the simulated skin layer and the simulated lymph node layer. The first strength of attachment may be greater or less than the second strength of attachment.

The simulated skin layer may be attached to the simulated airway (hyoid bone, thyroid cartilage, cricoid cartilage, tracheal rings) and a first strength of attachment between the simulated skin layer and the simulated airway (hyoid bone, thyroid cartilage, cricoid cartilage, tracheal rings) may differ from a second strength of attachment between the simulated skin layer and the simulated airway (hyoid bone, thyroid cartilage, cricoid cartilage, tracheal rings). The first strength of attachment may be greater or less than the second strength of attachment.

The simulated skin layer may be attached to the simulated thyroid gland and a first strength of attachment between the simulated skin layer and the simulated thyroid gland may differ from a second strength of attachment between the simulated skin layer and the simulated thyroid gland. The first strength of attachment may be greater or less than the second strength of attachment.

The simulated skin layer may be attached to the simulated parathyroid glands and a first strength of attachment between the simulated skin layer and the simulated parathyroid glands may differ from a second strength of attachment between the simulated skin layer and the simulated parathyroid glands. The first strength of attachment may be greater or less than the second strength of attachment.

The simulated skin layer may be attached to the simulated recurrent laryngeal nerves and a first strength of attachment between the simulated skin layer and the simulated recurrent laryngeal nerves may differ from a second strength of attachment between the simulated skin layer and the simulated recurrent laryngeal nerves. The first strength of attachment may be greater or less than the second strength of attachment.

The simulated skin layer may be attached to the simulated esophagus and a first strength of attachment between the simulated skin layer and the simulated esophagus may differ from a second strength of attachment between the simulated skin layer and the simulated esophagus. The first strength of attachment may be greater or less than the second strength of attachment.

The simulated skin layer may be attached to the simulated anatomical anomaly and a first strength of attachment between the simulated skin layer and the simulated anatomical anomaly may differ from a second strength of attachment between the simulated skin layer and the simulated anatomical anomaly. The first strength of attachment may be greater or less than the second strength of attachment.

The simulated skin layer may be attached to the simulated base and a first strength of attachment between the simulated skin layer and the simulated base may differ from a second strength of attachment between the simulated skin layer and the simulated base. The first strength of attachment may be greater or less than the second strength of attachment.

The simulated fat layer may be attached to the simulated vessels and a first strength of attachment between the simulated fat layer and the simulated vessels may differ from a second strength of attachment between the simulated fat layer and the simulated vessels. The first strength of attachment may be greater or less than the second strength of attachment.

The simulated fat layer may be attached to the simulated muscles and a first strength of attachment between the simulated fat layer and the simulated muscle layer may differ from a second strength of attachment between the simulated fat layer and the simulated muscle layer. The first strength of attachment may be greater or less than the second strength of attachment.

The simulated fat layer may be attached to the simulated lymph node layer and a first strength of attachment between the simulated fat layer and the simulated lymph node layer may differ from a second strength of attachment between the simulated fat layer and the simulated lymph node layer. The first strength of attachment may be greater or less than the second strength of attachment.

The simulated fat layer may be attached to the simulated airway (hyoid bone, thyroid cartilage, cricoid cartilage, tracheal rings) and a first strength of attachment between the simulated fat layer and the simulated airway (hyoid bone, thyroid cartilage, cricoid cartilage, tracheal rings) may differ from a second strength of attachment between the simulated fat layer and the simulated airway (hyoid bone, thyroid cartilage, cricoid cartilage, tracheal rings). The first strength of attachment may be greater or less than the second strength of attachment.

The simulated fat layer may be attached to the simulated thyroid gland and a first strength of attachment between the simulated fat layer and the simulated thyroid gland may differ from a second strength of attachment between the simulated fat layer and the simulated thyroid gland. The first strength of attachment may be greater or less than the second strength of attachment.

The simulated fat layer may be attached to the simulated parathyroid glands and a first strength of attachment between the simulated fat layer and the simulated parathyroid glands may differ from a second strength of attachment between the simulated fat layer and the simulated parathyroid glands. The first strength of attachment may be greater or less than the second strength of attachment.

The simulated fat layer may be attached to the simulated recurrent laryngeal nerves and a first strength of attachment between the simulated fat layer and the simulated recurrent laryngeal nerves may differ from a second strength of attachment between the simulated fat layer and the simulated recurrent laryngeal nerves. The first strength of attachment may be greater or less than the second strength of attachment.

The simulated fat layer may be attached to the simulated esophagus and a first strength of attachment between the simulated fat layer and the simulated esophagus may differ from a second strength of attachment between the simulated fat layer and the simulated esophagus. The first strength of attachment may be greater or less than the second strength of attachment.

The simulated fat layer may be attached to the simulated anatomical anomaly and a first strength of attachment between the simulated fat layer and the simulated anatomical anomaly may differ from a second strength of attachment between the simulated fat layer and the simulated anatomical anomaly. The first strength of attachment may be greater or less than the second strength of attachment.

The simulated fat layer may be attached to the simulated base and a first strength of attachment between the simulated fat layer and the simulated base may differ from a second strength of attachment between the simulated fat layer and the simulated base. The first strength of attachment may be greater or less than the second strength of attachment.

The simulated vessels may be attached to the simulated muscles and a first strength of attachment between the simulated vessels and the simulated muscle layer may differ from a second strength of attachment between the simulated vessels and the simulated muscle layer. The first strength of attachment may be greater or less than the second strength of attachment.

The simulated vessels may be attached to the simulated lymph node layer and a first strength of attachment between the simulated vessels and the simulated lymph node layer may differ from a second strength of attachment between the simulated vessels and the simulated lymph node layer. The first strength of attachment may be greater or less than the second strength of attachment.

The simulated vessels may be attached to the simulated airway (hyoid bone, thyroid cartilage, cricoid cartilage, tracheal rings) and a first strength of attachment between the simulated vessels and the simulated airway (hyoid bone, thyroid cartilage, cricoid cartilage, tracheal rings) may differ from a second strength of attachment between the simulated vessels and the simulated airway (hyoid bone, thyroid cartilage, cricoid cartilage, tracheal rings). The first strength of attachment may be greater or less than the second strength of attachment.

The simulated vessels may be attached to the simulated thyroid gland and a first strength of attachment between the simulated vessels and the simulated thyroid gland may differ from a second strength of attachment between the simulated vessels and the simulated thyroid gland. The first strength of attachment may be greater or less than the second strength of attachment.

The simulated vessels may be attached to the simulated parathyroid glands and a first strength of attachment between the simulated vessels and the simulated parathyroid glands may differ from a second strength of attachment between the simulated vessels and the simulated parathyroid glands. The first strength of attachment may be greater or less than the second strength of attachment.

The simulated vessels may be attached to the simulated recurrent laryngeal nerves and a first strength of attachment between the simulated vessels and the simulated recurrent laryngeal nerves may differ from a second strength of attachment between the simulated vessels and the simulated recurrent laryngeal nerves. The first strength of attachment may be greater or less than the second strength of attachment.

The simulated vessels may be attached to the simulated esophagus and a first strength of attachment between the simulated vessels and the simulated esophagus may differ from a second strength of attachment between the simulated vessels and the simulated esophagus. The first strength of attachment may be greater or less than the second strength of attachment.

The simulated vessels may be attached to the simulated anatomical anomaly and a first strength of attachment between the simulated vessels and the simulated anatomical anomaly may differ from a second strength of attachment between the simulated vessels and the simulated anatomical anomaly. The first strength of attachment may be greater or less than the second strength of attachment.

The simulated vessels may be attached to the simulated base and a first strength of attachment between the simulated vessels and the simulated base may differ from a second strength of attachment between the simulated vessels and the simulated base. The first strength of attachment may be greater or less than the second strength of attachment.

The simulated muscles may be attached to the simulated lymph node layer and a first strength of attachment between the simulated muscles and the simulated lymph node layer may differ from a second strength of attachment between the simulated muscles and the simulated lymph node layer. The first strength of attachment may be greater or less than the second strength of attachment.

The simulated muscles may be attached to the simulated airway (hyoid bone, thyroid cartilage, cricoid cartilage, tracheal rings) and a first strength of attachment between the simulated muscles and the simulated airway (hyoid bone, thyroid cartilage, cricoid cartilage, tracheal rings) may differ from a second strength of attachment between the simulated muscles and the simulated airway (hyoid bone, thyroid cartilage, cricoid cartilage, tracheal rings). The first strength of attachment may be greater or less than the second strength of attachment.

The simulated muscles may be attached to the simulated thyroid gland and a first strength of attachment between the simulated muscles and the simulated thyroid gland may differ from a second strength of attachment between the simulated muscles and the simulated thyroid gland. The first strength of attachment may be greater or less than the second strength of attachment.

The simulated muscles may be attached to the simulated parathyroid glands and a first strength of attachment between the simulated muscles and the simulated parathyroid glands may differ from a second strength of attachment between the simulated muscles and the simulated parathyroid glands. The first strength of attachment may be greater or less than the second strength of attachment.

The simulated muscles may be attached to the simulated recurrent laryngeal nerves and a first strength of attachment between the simulated muscles and the simulated recurrent laryngeal nerves may differ from a second strength of attachment between the simulated muscles and the simulated recurrent laryngeal nerves. The first strength of attachment may be greater or less than the second strength of attachment.

The simulated muscles may be attached to the simulated esophagus and a first strength of attachment between the simulated muscles and the simulated esophagus may differ from a second strength of attachment between the simulated muscles and the simulated esophagus. The first strength of attachment may be greater or less than the second strength of attachment.

The simulated muscles may be attached to the simulated anatomical anomaly and a first strength of attachment between the simulated muscles and the simulated anatomical anomaly may differ from a second strength of attachment between the simulated muscles and the simulated anatomical anomaly. The first strength of attachment may be greater or less than the second strength of attachment.

The simulated muscles may be attached to the simulated base and a first strength of attachment between the simulated muscles and the simulated base may differ from a second strength of attachment between the simulated muscles and the simulated base. The first strength of attachment may be greater or less than the second strength of attachment.

The simulated lymph node layer may be attached to the simulated airway (hyoid bone, thyroid cartilage, cricoid cartilage, tracheal rings) and a first strength of attachment between the simulated lymph node layer and the simulated airway (hyoid bone, thyroid cartilage, cricoid cartilage, tracheal rings) may differ from a second strength of attachment between the simulated lymph node layer and the simulated airway (hyoid bone, thyroid cartilage, cricoid cartilage, tracheal rings). The first strength of attachment may be greater or less than the second strength of attachment.

The simulated lymph node layer may be attached to the simulated thyroid gland and a first strength of attachment between the simulated lymph node layer and the simulated thyroid gland may differ from a second strength of attachment between the simulated lymph node layer and the simulated thyroid gland. The first strength of attachment may be greater or less than the second strength of attachment.

The simulated lymph node layer may be attached to the simulated parathyroid glands and a first strength of attachment between the simulated lymph node layer and the simulated parathyroid glands may differ from a second strength of attachment between the simulated lymph node layer and the simulated parathyroid glands. The first strength of attachment may be greater or less than the second strength of attachment.

The simulated lymph node layer may be attached to the simulated recurrent laryngeal nerves and a first strength of attachment between the simulated lymph node layer and the simulated recurrent laryngeal nerves may differ from a second strength of attachment between the simulated lymph node layer and the simulated recurrent laryngeal nerves. The first strength of attachment may be greater or less than the second strength of attachment.

The simulated lymph node layer may be attached to the simulated esophagus and a first strength of attachment between the simulated lymph node layer and the simulated esophagus may differ from a second strength of attachment between the simulated lymph node layer and the simulated esophagus. The first strength of attachment may be greater or less than the second strength of attachment.

The simulated lymph node layer may be attached to the simulated anatomical anomaly and a first strength of attachment between the simulated lymph node layer and the simulated anatomical anomaly may differ from a second strength of attachment between the simulated lymph node layer and the simulated anatomical anomaly. The first strength of attachment may be greater or less than the second strength of attachment.

The simulated lymph node layer may be attached to the simulated base and a first strength of attachment between the simulated lymph node layer and the simulated base may differ from a second strength of attachment between the simulated lymph node layer and the simulated base. The first strength of attachment may be greater or less than the second strength of attachment.

The simulated airway (hyoid bone, thyroid cartilage, cricoid cartilage, tracheal rings) may be attached to the simulated thyroid gland and a first strength of attachment between the simulated airway (hyoid bone, thyroid cartilage, cricoid cartilage, tracheal rings) and the simulated thyroid gland may differ from a second strength of attachment between the simulated airway (hyoid bone, thyroid cartilage, cricoid cartilage, tracheal rings) and the simulated thyroid gland. The first strength of attachment may be greater or less than the second strength of attachment.

The simulated airway (hyoid bone, thyroid cartilage, cricoid cartilage, tracheal rings) may be attached to the simulated parathyroid glands and a first strength of attachment between the simulated airway (hyoid bone, thyroid cartilage, cricoid cartilage, tracheal rings) and the simulated parathyroid glands may differ from a second strength of attachment between the simulated airway (hyoid bone, thyroid cartilage, cricoid cartilage, tracheal rings) and the simulated parathyroid glands. The first strength of attachment may be greater or less than the second strength of attachment.

The simulated airway (hyoid bone, thyroid cartilage, cricoid cartilage, tracheal rings) may be attached to the simulated recurrent laryngeal nerves and a first strength of attachment between the simulated airway (hyoid bone, thyroid cartilage, cricoid cartilage, tracheal rings) and the simulated recurrent laryngeal nerves may differ from a second strength of attachment between the simulated airway (hyoid bone, thyroid cartilage, cricoid cartilage, tracheal rings) and the simulated recurrent laryngeal nerves. The first strength of attachment may be greater or less than the second strength of attachment.

The simulated airway (hyoid bone, thyroid cartilage, cricoid cartilage, tracheal rings) may be attached to the simulated esophagus and a first strength of attachment between the simulated airway (h hyoid bone, thyroid cartilage, cricoid cartilage, tracheal rings) and the simulated esophagus may differ from a second strength of attachment between the simulated airway (hyoid bone, thyroid cartilage, cricoid cartilage, tracheal rings) and the simulated esophagus. The first strength of attachment may be greater or less than the second strength of attachment.

The simulated airway (hyoid bone, thyroid cartilage, cricoid cartilage, tracheal rings) may be attached to the simulated anatomical anomaly and a first strength of attachment between the simulated airway (hyoid bone, thyroid cartilage, cricoid cartilage, tracheal rings) and the simulated anatomical anomaly may differ from a second strength of attachment between the simulated airway (hyoid bone, thyroid cartilage, cricoid cartilage, tracheal rings) and the simulated anatomical anomaly. The first strength of attachment may be greater or less than the second strength of attachment.

The simulated airway (hyoid bone, thyroid cartilage, cricoid cartilage, tracheal rings) may be attached to the simulated base and a first strength of attachment between the simulated airway (hyoid bone, thyroid cartilage, cricoid cartilage, tracheal rings) and the simulated base may differ from a second strength of attachment between the simulated airway (hyoid bone, thyroid cartilage, cricoid cartilage, tracheal rings) and the simulated base. The first strength of attachment may be greater or less than the second strength of attachment.

The simulated thyroid gland may be attached to the simulated parathyroid glands and a first strength of attachment between the simulated thyroid gland and the simulated parathyroid glands may differ from a second strength of attachment between the simulated thyroid gland and the simulated parathyroid glands. The first strength of attachment may be greater or less than the second strength of attachment.

The simulated thyroid gland may be attached to the simulated recurrent laryngeal nerves and a first strength of attachment between the simulated thyroid gland and the simulated recurrent laryngeal nerves may differ from a second strength of attachment between the simulated thyroid gland and the simulated recurrent laryngeal nerves. The first strength of attachment may be greater or less than the second strength of attachment.

The simulated thyroid gland may be attached to the simulated esophagus and a first strength of attachment between the simulated thyroid gland and the simulated esophagus may differ from a second strength of attachment between the simulated thyroid gland and the simulated esophagus. The first strength of attachment may be greater or less than the second strength of attachment.

The simulated thyroid gland may be attached to the simulated anatomical anomaly and a first strength of attachment between the simulated thyroid gland and the simulated anatomical anomaly may differ from a second strength of attachment between the simulated thyroid gland and the simulated anatomical anomaly. The first strength of attachment may be greater or less than the second strength of attachment.

The simulated thyroid gland may be attached to the simulated base and a first strength of attachment between the simulated thyroid gland and the simulated base may differ from a second strength of attachment between the simulated thyroid gland and the simulated base. The first strength of attachment may be greater or less than the second strength of attachment.

The simulated parathyroid glands may be attached to the simulated recurrent laryngeal nerves and a first strength of attachment between the simulated parathyroid glands and the simulated recurrent laryngeal nerves may differ from a second strength of attachment between the simulated parathyroid glands and the simulated recurrent laryngeal nerves. The first strength of attachment may be greater or less than the second strength of attachment.

The simulated parathyroid glands may be attached to the simulated esophagus and a first strength of attachment between the simulated parathyroid glands and the simulated esophagus may differ from a second strength of attachment between the simulated parathyroid glands and the simulated esophagus. The first strength of attachment may be greater or less than the second strength of attachment.

The simulated parathyroid glands may be attached to the simulated anatomical anomaly and a first strength of attachment between the simulated parathyroid glands and the simulated anatomical anomaly may differ from a second strength of attachment between the simulated parathyroid glands and the simulated anatomical anomaly. The first strength of attachment may be greater or less than the second strength of attachment.

The simulated parathyroid glands may be attached to the simulated base and a first strength of attachment between the simulated parathyroid glands and the simulated base may differ from a second strength of attachment between the simulated parathyroid glands and the simulated base. The first strength of attachment may be greater or less than the second strength of attachment.

The simulated recurrent laryngeal nerves may be attached to the simulated esophagus and a first strength of attachment between the simulated recurrent laryngeal nerves and the simulated esophagus may differ from a second strength of attachment between the simulated recurrent laryngeal nerves and the simulated esophagus. The first strength of attachment may be greater or less than the second strength of attachment.

The simulated recurrent laryngeal nerves may be attached to the simulated anatomical anomaly and a first strength of attachment between the simulated recurrent laryngeal nerves and the simulated anatomical anomaly may differ from a second strength of attachment between the simulated recurrent laryngeal nerves and the simulated anatomical anomaly. The first strength of attachment may be greater or less than the second strength of attachment.

The simulated recurrent laryngeal nerves may be attached to the simulated base and a first strength of attachment between the simulated recurrent laryngeal nerves and the simulated base may differ from a second strength of attachment between the simulated recurrent laryngeal nerves and the simulated base. The first strength of attachment may be greater or less than the second strength of attachment.

The simulated esophagus may be attached to the simulated anatomical anomaly and a first strength of attachment between the simulated esophagus and the simulated anatomical anomaly may differ from a second strength of attachment between the simulated esophagus and the simulated anatomical anomaly. The first strength of attachment may be greater or less than the second strength of attachment.

The simulated esophagus may be attached to the simulated base and a first strength of attachment between the simulated esophagus and the simulated base may differ from a second strength of attachment between the simulated esophagus and the simulated base. The first strength of attachment may be greater or less than the second strength of attachment.

The simulated anatomical anomaly may be attached to the simulated base and a first strength of attachment between the simulated anatomical anomaly and the simulated base may differ from a second strength of attachment between the simulated anatomical anomaly and the simulated base. The first strength of attachment may be greater or less than the second strength of attachment.

The simulated prevertebral fascia may be attached to the base or to any of the simulated layer of skin, simulated layer of fat, simulated blood vessels including veins and arteries with colored fluid within, simulated neck muscles, simulated lymph nodes, simulated thyroid gland, simulated parathyroid glands and simulated recurrent laryngeal nerves, simulated trachea and airway with a simulated hyoid bone, simulated thyroid cartilage, simulated cricoid cartilage, simulated arytenoid cartilages, simulated larynx, simulated tracheal rings, simulated mucosa and simulated trachealis muscle, and/or simulated esophagus.

According to another aspect, there is provided a method of learning or practicing surgery or procedures of the neck and airway, involving piercing, injecting, incising, dissecting, dividing, retracting, moving, mobilizing, reorienting, suturing, or any other alteration of simulated tissue performed through the use of manual instruments, powered instruments or a surgical robot, on one or more of the simulated layer of skin, simulated layer of fat, simulated blood vessels including veins and arteries with colored fluid within, simulated neck muscles, simulated lymph nodes, simulated thyroid gland, simulated parathyroid glands and simulated recurrent laryngeal nerves, simulated trachea and airway with a simulated hyoid bone, simulated thyroid cartilage, simulated cricoid cartilage, simulated arytenoid cartilages, simulated larynx, simulated tracheal rings, simulated mucosa and simulated trachealis muscle, simulated esophagus, and simulated prevertebral fascia.

Before explaining at least one embodiment of the invention in detail, it is to be understood that the invention is not limited in its application to the details of the construction and to the arrangements of the components set forth in the following description or illustrated in the drawings. The invention is capable of other embodiments and of being practiced or carried out in various ways. Also, it is to be understood that the phraseology and terminology employed herein are for the purpose of description and should not be regarded as limiting.

The present invention enables the provision of exploring, palpating, or practicing surgery or procedures involving the neck and airway in an effective manner. The simulator and method of learning or practicing surgery or procedures of the neck and airway described herein are a significant advancement of the art and provide a practical and cost-effective system for broader dissemination of such instruction and/or practice.

While the present neck simulator has been illustrated to interface with known anatomical mimics, such as Laerdal's® SimMan® 3G (model 2017) shown in FIGS. 8A and 8B, and Laerdal's® SimMan® Classic shown in FIGS. 9A and 9B, and the Laerdal@ Airway Management Trainer shown in FIGS. 10A and 10B, it will be understood by those skilled in the art that the present neck simulator may be designed and dimensioned for any known simulator and for any patient age, from infant to adult.

In summary, the present disclosure discloses embodiments of a simulator for practicing surgery or procedures involving the neck and airway. In an embodiment the simulator includes
  a) a rigid base having a pattern of grooves on a top surface thereof;
  b) an anatomical structure/tissue layer to mimic the neck and airway of a person mounted on the top surface of the rigid base;
  c) the anatomical structure/tissue layer comprised of:
    skin mimicked by a polymer material having a tensile strength in a range from about 100 to about 650 psi, a modulus M100 in a range from about 5 to about 150 psi, and a Die B tear strength in a range from about 10 to about 200 pli (about 1.8 to about 26.3 kN/m);
    fat mimicked by a polymer material having a tensile strength in a range from about 10 to about 600 psi, a modulus M100 in a range from about 1 to about 100 psi, and a Die B tear strength in a range from about 10 to about 150 pli (about 1.8 to about 8.8 kN/m);
    lymph nodes mimicked by a polymer material having a tensile strength in a range from about 10 to about 600 psi, a modulus M100 in a range from about 1 to about 100 psi, and a Die B tear strength in a range from about 10 to about 150 pli (about 1.8 to about 8.8 kN/m);
    muscles synthesized to mimic sternocleidomastoideoles, sternohyoid muscles, sternothyroid muscles, omohyoid muscles, thyrohyoid muscles, and cricothyroid muscles, the muscles comprised of a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
    blood vessels synthesized to mimic anterior jugular veins, external jugular veins, internal jugular veins and carotid arteries, the blood vessels comprised of a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
    a thyroid gland mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
    parathyroid glands mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
    laryngeal and tracheal cartilage synthesized to mimic hyoid bone, thyroid cartilage, cricoid cartilage, tracheal rings, epiglottis, arytenoid cartilages, mimicked by a polymer material having a tensile strength in a range from about 100 to about 1000 psi, a modulus M100 in a range from about 10 to about 450 psi, and a Die B tear strength in a range from about 50 to about 250 pli (about 8.8 to about 43.8 kN/m);
    mucosa mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m); and
    recurrent laryngeal nerves mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m); and
    trachealis muscle mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m); and esophagus mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m); and prevertebral fascia mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);

In an embodiment the polymer mimicking the skin has a tensile strength in a range from about 150 to about 600 psi, a modulus M100 in a range from about 15 to about 100 psi, and a Die B tear strength in a range from about 60 to about 150 pli.

and wherein the polymer mimicking fat has a tensile strength in a range from about 20 to about 550 psi, a modulus M100 in a range from about 2 to about 50 psi, and a Die B tear strength in a range from about 15 to about 100 pli, and wherein the polymer material mimicking the lymph nodes has a tensile strength in a range from about 20 to about 550 psi, a modulus M100 in a range from about 2 to about 50 psi, and a Die B tear strength in a range from about 15 to about 100 pli, and wherein the polymer material mimicking the muscles has a tensile strength in a range from about 100 to about 550 psi, a modulus M100 in a range from about 3 to about 85 psi, and a Die B tear strength in a range from about 15 to about 120 pli, and wherein the polymer mimicking the blood vessels has a tensile strength in a range from about 100 to about 550 psi, a modulus M100 in a range from about 3 to about 85 psi, and a Die B tear strength in a range from about 15 to about 120 pli, and wherein the polymer material mimicking the thyroid gland has a tensile strength in a range from about 100 to about 550 psi, a modulus M100 in a range from about 3 to about 85 psi, and a Die B tear strength in a range from about 15 to about 120 pli, and wherein the polymer material mimicking the parathyroid glands has a tensile strength in a range from about 100 to about 550 psi, a modulus M100 in a range from about 3 to about 85 psi, and a Die B tear strength in a range from about 15 to about 120 pli, and wherein the polymer material mimicking the hyoid bone, thyroid cartilage, cricoid cartilage, tracheal rings, epiglottis and arytenoid cartilages have a tensile strength in a range from about 150 to about 950 psi, a modulus M100 in a range from about 60 to about 400 psi, and a Die B tear strength in a range from about 100 to about 200 pli, and wherein the polymer material mimicking the mucosa has a tensile strength in a range from about 100 to about 550 psi, a modulus M100 in a range from about 3 to about 85 psi, and a Die B tear strength in a range from about 15 to about 120 pli, and wherein the polymer material mimicking the recurrent laryngeal nerves has a tensile strength in a range from about 100 to about 550 psi, a modulus M100 in a range from about 3 to about 85 psi, and a Die B tear strength in a range from about 15 to about 120 pli, and wherein the polymer material mimicking the esophagus has a tensile strength in a range from about 100 to about 550 psi, a modulus M100 in a range from about 3 to about 85 psi, and a Die B tear strength in a range from about 15 to about 120 pli, and wherein the polymer material mimicking the prevertebral fascia has a tensile strength in a range from about 100 to about 550 psi, a modulus M100 in a range from about 3 to about 85 psi, and a Die B tear strength in a range from about 15 to about 120 pli.

In an embodiment the polymer mimicking the skin has a tensile strength in a range from about 530 to about 570 psi, a modulus M100 in a range from about 30 to about 70 psi, and a Die B tear strength in a range from about 100 to about 140 pli.

and wherein the polymer mimicking fat has a tensile strength in a range from about 80 to about 120 psi, a modulus M100 in a range from about 3 to about 25 psi, and a Die B tear strength in a range from about 20 to about 44 pli, and wherein the polymer material mimicking the lymph nodes has a tensile strength in a range from about 80 to about 120 psi, a modulus M100 in a range from about 3 to about 25 psi, and a Die B tear strength in a range from about 20 to about 44 pli, and wherein the polymer material mimicking the muscles has a tensile strength in a range from about 140 to about 180 psi, a modulus M100 in a range from about 5 to about 28 psi, and a Die B tear strength in a range from about 20 to about 50 pli, and wherein the polymer mimicking the blood vessels has a tensile strength in a range from about 140 to about 180 psi, a modulus M100 in a range from about 5 to about 28 psi, and a Die B tear strength in a range from about 20 to about 50 pli, and wherein the polymer material mimicking the thyroid gland has a tensile strength in a range from about 140 to about 180 psi, a modulus M100 in a range from about 5 to about 28 psi, and a Die B tear strength in a range from about 20 to about 50 pli, and wherein the polymer material mimicking the parathyroid glands has tensile strength in a range from about 140 to about 180 psi, a modulus M100 in a range from about 5 to about 28 psi, and a Die B tear strength in a range from about 20 to about 50 pli, and wherein the polymer material mimicking the hyoid bone, thyroid cartilage, cricoid cartilage, tracheal rings, epiglottis and arytenoid cartilages have a tensile strength in a range from about 860 to about 900 psi, a modulus M100 in a range from about 280 to about 320 psi, and a Die B tear strength in a range from about 120 to about 160 pli, and wherein the polymer material mimicking the mucosa has a tensile strength in a range from about 140 to about 180 psi, a modulus M100 in a range from about 5 to about 28 psi, and a Die B tear strength in a range from about 20 to about 50 pli, and wherein the polymer material mimicking the recurrent laryngeal nerves has a tensile strength in a range from about 140 to about 180 psi, a modulus M100 in a range from about 5 to about 28 psi, and a Die B tear strength in a range from about 20 to about 50 pli, and wherein the polymer material mimicking the esophagus has a tensile strength in a range from about 140 to about 180 psi, a modulus M100 in a range from about 5 to about 28 psi, and a Die B tear strength in a range from about 20 to about 50 pli, and wherein the polymer material mimicking the prevertebral fascia has a tensile strength in a range from about 140 to about 180 psi, a modulus M100 in a range from about 5 to about 28 psi, and a Die B tear strength in a range from about 20 to about 50 pli.

In an embodiment the polymer mimicking the skin has a tensile strength of about 550 psi, a modulus M100 of about 49 psi, and a Die B tear strength of about 120 pli, and wherein the polymer mimicking the fat has a tensile strength of about 100 psi, a modulus M100 of about 5 psi, and a Die B tear strength of about 24 pli, and and wherein the polymer material mimicking the lymph nodes has a tensile strength of about 100 psi, a modulus M100 of about 5 psi, and a Die B tear strength of about 24 pli, and wherein the polymer material mimicking the muscles have a tensile strength of about 160 psi, a modulus M100 of about 8 psi, and a Die B tear strength of about 30 pli, and wherein the polymer material mimicking the blood vessels has a tensile strength of about 160 psi, a modulus M100 of about 8 psi, and a Die B tear strength of about 30 pli, and wherein the polymer material mimicking the thyroid gland has a tensile strength of about 160 psi, a modulus M100 of about 8 psi, and a Die B tear strength of about 30 pli, and wherein the polymer material mimicking the parathyroid glands has a tensile strength of about 160 psi, a modulus M100 of about 8 psi, and a Die B tear strength of about 30 pli, and wherein the polymer material mimicking the hyoid bone, thyroid cartilage, cricoid cartilage, tracheal rings, epiglottis, arytenoid cartilages, has a tensile strength of about 880 psi, a modulus M100 of about 300 psi, and a Die B tear strength of about 136 pli, and wherein the polymer material mimicking the mucosa has a tensile strength of about 160 psi, a modulus M100 of about 8 psi, and a Die B tear strength of about 30 pli, and wherein the polymer material mimicking the recurrent laryngeal nerves has a tensile strength of about 160 psi, a modulus M100 of about 8 psi, and a Die B tear strength of about 30 pli, and wherein the polymer material mimicking the esophagus has a tensile strength of about 160 psi, a modulus M100 of about 8 psi, and a Die B tear strength of about 30 pli, and wherein the polymer material mimicking the prevertebral fascia has a tensile strength of about 160 psi, a modulus M100 of about 8 psi, and a Die B tear strength of about 30 pli.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A simulator for practicing surgery or procedures involving the neck and airway, comprising:
   a) a rigid base having a pattern of landmarks on a top surface thereof and integrally formed on the top surface of said rigid base, said rigid base having a size and shape to fit around a neck section of commercially available patient simulators or mannequins;
   b) an anatomical structure/tissue layer to mimic the neck and airway of a person mounted on the top surface of the rigid base;
   c) the anatomical structure/tissue layer comprised of:
      skin mimicked by a polymer material having a tensile strength in a range from about 100 to about 650 psi, a modulus M100 in a range from about 5 to about 150 psi, and a Die B tear strength in a range from about 10 to about 200 pli (about 1.8 to about 26.3 kN/m);
      fat mimicked by a polymer material having a tensile strength in a range from about 10 to about 600 psi, a modulus M100 in a range from about 1 to about 100 psi, and a Die B tear strength in a range from about 10 to about 150 pli (about 1.8 to about 8.8 kN/m);
      lymph nodes mimicked by a polymer material having a tensile strength in a range from about 10 to about 600 psi, a modulus M100 in a range from about 1 to about 100 psi, and a Die B tear strength in a range from about 10 to about 150 pli (about 1.8 to about 8.8 kN/m);
      muscles synthesized to mimic sternocleidomastoideoles, sternohyoid muscles, sternothyroid muscles, omohyoid muscles, thyrohyoid muscles, and cricothyroid muscles, the muscles comprised of a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
      blood vessels synthesized to mimic anterior jugular veins, external jugular veins, internal jugular veins and carotid arteries, the blood vessels comprised of a polymer material having a tensile strength in a range from about 50 to about 600 psi, a modulus M100 in a range from about 2 to about 135 psi, and a Die B tear strength in a range from about 10 to about 170 pli (about 1.8 to about 21 KN/m);
      a thyroid gland mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
      parathyroid glands mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
      laryngeal and tracheal cartilage synthesized to mimic each of the hyoid bone, thyroid cartilage, cricoid cartilage, tracheal rings, epiglottis, arytenoid cartilages, mimicked by a polymer material having a tensile strength in a range from about 100 to about 1000 psi, a modulus M100 in a range from about 10 to about 450 psi, and a Die B tear strength in a range from about 50 to about 250 pli (about 8.8 to about 43.8 kN/m);
      mucosa mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);
      recurrent laryngeal nerves mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);

trachealis muscle mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);

esophagus mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m);

prevertebral fascia mimicked by a polymer material having a tensile strength in a range from about 50 to about 600 psi, a modulus M100 in a range from about 2 to about 135 psi, and a Die B tear strength in a range from about 10 to about 170 pli (about 1.8 to about 21 kN/m); and wherein the pattern of landmarks provides a layout on the rigid base for proper and consistent attachment of one or more mimicked structures of the anatomical structure/tissue layer directly to the rigid base to mimic the human neck and airway.

2. The simulator according to claim 1, wherein the polymer material mimicking skin the skin has a tensile strength in a range from about 150 to about 600 psi, a modulus M100 in a range from about 15 to about 100 psi, and a Die B tear strength in a range from about 60 to about 150 pli;

and wherein the polymer mimicking fat has a tensile strength in a range from about 20 to about 550 psi, a modulus M100 in a range from about 2 to about 50 psi, and a Die B tear strength in a range from about 15 to about 100 pli;

and wherein the polymer material mimicking the lymph nodes has a tensile strength in a range from about 20 to about 550 psi, a modulus M100 in a range from about 2 to about 50 psi, and a Die B tear strength in a range from about 15 to about 100 pli;

and wherein the polymer material mimicking the muscles has a tensile strength in a range from about 100 to about 550 psi, a modulus M100 in a range from about 3 to about 85 psi, and a Die B tear strength in a range from about 15 to about 120 pli;

and wherein the polymer mimicking the blood vessels has a tensile strength in a range from about 100 to about 550 psi, a modulus M100 in a range from about 3 to about 85 psi, and a Die B tear strength in a range from about 15 to about 120 pli;

and wherein the polymer material mimicking the thyroid gland has a tensile strength in a range from about 100 to about 550 psi, a modulus M100 in a range from about 3 to about 85 psi, and a Die B tear strength in a range from about 15 to about 120 pli;

and wherein the polymer material mimicking the parathyroid glands has a tensile strength in a range from about 100 to about 550 psi, a modulus M100 in a range from about 3 to about 85 psi, and a Die B tear strength in a range from about 15 to about 120 pli, and wherein the polymer material mimicking the hyoid bone, thyroid cartilage, cricoid cartilage, tracheal rings, epiglottis and arytenoid cartilages have a tensile strength in a range from about 150 to about 950 psi, a modulus M100 in a range from about 60 to about 400 psi, and a Die B tear strength in a range from about 100 to about 200 pli;

and wherein the polymer material mimicking the mucosa has a tensile strength in a range from about 100 to about 550 psi, a modulus M100 in a range from about 3 to about 85 psi, and a Die B tear strength in a range from about 15 to about 120 pli;

and wherein the polymer material mimicking the recurrent laryngeal nerves has a tensile strength in a range from about 100 to about 550 psi, a modulus M100 in a range from about 3 to about 85 psi, and a Die B tear strength in a range from about 15 to about 120 pli;

and wherein the polymer material mimicking the esophagus has a tensile strength in a range from about 100 to about 550 psi, a modulus M100 in a range from about 3 to about 85 psi, and a Die B tear strength in a range from about 15 to about 120 pli;

and wherein the polymer material mimicking the prevertebral fascia has a tensile strength in a range from about 100 to about 550 psi, a modulus M100 in a range from about 3 to about 85 psi, and a Die B tear strength in a range from about 15 to about 120 pli.

3. The simulator according to claim 1, wherein the polymer material mimicking the skin has a tensile strength in a range from about 530 to about 570 psi, a modulus M100 in a range from about 30 to about 70 psi, and a Die B tear strength in a range from about 100 to about 140 pli;

and wherein the polymer mimicking fat has a tensile strength in a range from about 80 to about 120 psi, a modulus M100 in a range from about 3 to about 25 psi, and a Die B tear strength in a range from about 20 to about 44 pli;

and wherein the polymer material mimicking the lymph nodes has a tensile strength in a range from about 80 to about 120 psi, a modulus M100 in a range from about 3 to about 25 psi, and a Die B tear strength in a range from about 20 to about 44 pli;

and wherein the polymer material mimicking the muscles has a tensile strength in a range from about 140 to about 180 psi, a modulus M100 in a range from about 5 to about 28 psi, and a Die B tear strength in a range from about 20 to about 50 pli;

and wherein the polymer mimicking the blood vessels has a tensile strength in a range from about 140 to about 180 psi, a modulus M100 in a range from about 5 to about 28 psi, and a Die B tear strength in a range from about 20 to about 50 pli;

and wherein the polymer material mimicking the thyroid gland has a tensile strength in a range from about 140 to about 180 psi, a modulus M100 in a range from about 5 to about 28 psi, and a Die B tear strength in a range from about 20 to about 50 pli;

and wherein the polymer material mimicking the parathyroid glands has tensile strength in a range from about 140 to about 180 psi, a modulus M100 in a range from about 5 to about 28 psi, and a Die B tear strength in a range from about 20 to about 50 pli;

and wherein the polymer material mimicking the hyoid bone, thyroid cartilage, cricoid cartilage, tracheal rings, epiglottis and arytenoid cartilages have a tensile strength in a range from about 860 to about 900 psi, a modulus M100 in a range from about 280 to about 320 psi, and a Die B tear strength in a range from about 120 to about 160 pli;

and wherein the polymer material mimicking the mucosa has a tensile strength in a range from about 140 to about 180 psi, a modulus M100 in a range from about 5 to about 28 psi, and a Die B tear strength in a range from about 20 to about 50 pli;

and wherein the polymer material mimicking the recurrent laryngeal nerves has a tensile strength in a range from about 140 to about 180 psi, a modulus M100 in a range from about 5 to about 28 psi, and a Die B tear strength in a range from about 20 to about 50 pli;

and wherein the polymer material mimicking the esophagus has a tensile strength in a range from about 140 to about 180 psi, a modulus M100 in a range from about 5 to about 28 psi, and a Die B tear strength in a range from about 20 to about 50 pli;

and wherein the polymer material mimicking the prevertebral fascia has a tensile strength in a range from about 140 to about 180 psi, a modulus M100 in a range from about 5 to about 28 psi, and a Die B tear strength in a range from about 20 to about 50 pli.

4. The simulator according to claim 1, wherein the polymer material mimicking the skin has a tensile strength of about 550 psi, a modulus M100 of about 49 psi, and a Die B tear strength of about 120 pli;

and wherein the polymer mimicking the fat has a tensile strength of about 100 psi, a modulus M100 of about 5 psi, and a Die B tear strength of about 24 pli;

and wherein the polymer material mimicking the lymph nodes has a tensile strength of about 100 psi, a modulus M100 of about 5 psi, and a Die B tear strength of about 24 pli;

and wherein the polymer material mimicking the muscles has a tensile strength of about 160 psi, a modulus M100 of about 8 psi, and a Die B tear strength of about 30 pli;

and wherein the polymer material mimicking the blood vessels has a tensile strength of about 160 psi, a modulus M100 of about 8 psi, and a Die B tear strength of about 30 pli;

and wherein the polymer material mimicking the thyroid gland has a tensile strength of about 160 psi, a modulus M100 of about 8 psi, and a Die B tear strength of about 30 pli;

and wherein the polymer material mimicking the parathyroid glands has a tensile strength of about 160 psi, a modulus M100 of about 8 psi, and a Die B tear strength of about 30 pli;

and wherein the polymer material mimicking the hyoid bone, thyroid cartilage, cricoid cartilage, tracheal rings, epiglottis, arytenoid cartilages has a tensile strength of about 880 psi, a modulus M100 of about 300 psi, and a Die B tear strength of about 136 pli;

and wherein the polymer material mimicking the mucosa has a tensile strength of about 160 psi, a modulus M100 of about 8 psi, and a Die B tear strength of about 30 pli;

and wherein the polymer material mimicking the recurrent laryngeal nerves has a tensile strength of about 160 psi, a modulus M100 of about 8 psi, and a Die B tear strength of about 30 pli;

and wherein the polymer material mimicking the esophagus has a tensile strength of about 160 psi, a modulus M100 of about 8 psi, and a Die B tear strength of about 30 pli;

and wherein the polymer material mimicking the prevertebral fascia has a tensile strength of about 160 psi, a modulus M100 of about 8 psi, and a Die B tear strength of about 30 pli.

5. The simulator according to claim 1, wherein the polymer material mimicking skin is a polymer in which the polymer is silicone rubber.

6. The simulator according to claim 1, wherein the polymer material mimicking fat is a polymer in which the polymer is silicone rubber gel.

7. The simulator according to claim 1, wherein the polymer material mimicking lymph nodes is a polymer in which the polymer is silicone rubber gel.

8. The simulator according to claim 1, wherein the polymer material mimicking muscles is a polymer in which the polymer is silicone rubber.

9. The simulator according to claim 1, wherein the polymer material mimicking blood vessels is a polymer in which the polymer is silicone rubber.

10. The simulator according to claim 1, wherein the polymer material mimicking the thyroid gland is a polymer in which the polymer is silicone rubber.

11. The simulator according to claim 1, wherein the polymer material mimicking parathyroid glands is a polymer in which the polymer is silicone rubber.

12. The simulator according to claim 1, wherein the polymer material mimicking laryngeal and tracheal cartilage is a polymer and particulate composite in which the polymer is urethane rubber, and wherein the particulate includes powder particles of corn starch.

13. The simulator according to claim 1, wherein the polymer material mimicking mucosa is a polymer in which the polymer is silicone rubber.

14. The simulator according to claim 1, wherein the polymer material mimicking recurrent laryngeal nerves is a polymer in which the polymer is silicone rubber.

15. The simulator according to claim 1, wherein the polymer material mimicking the trachealis muscle is a polymer in which the polymer is silicone rubber.

16. The simulator according to claim 1, wherein the polymer material mimicking the esophagus is a polymer in which the polymer is silicone rubber.

17. The simulator according to claim 1, wherein the polymer material mimicking the prevertebral fascia is a polymer in which the polymer is silicone rubber.

18. The simulator according to claim 1, wherein the pattern of landmarks is a plurality of grooves, and said one or more mimicked structures of the anatomical structure/tissue layer are attached to the rigid base along one or more corresponding grooves of the plurality of grooves.

19. The simulator according to claim 1, wherein the pattern of landmarks is a plurality of raised sections, and said one or more mimicked structures of the anatomical structure/tissue layer are attached to the rigid base along one or more corresponding raised sections of the plurality of raised sections.

20. The simulator according to claim 1, wherein the pattern of landmarks on the rigid base is completely covered by the anatomical structure/tissue layer upon attachment of the one or more mimicked structures of the anatomical structure/tissue layer.

* * * * *

UNITED STATES PATENT AND TRADEMARK OFFICE
CERTIFICATE OF CORRECTION

| | |
|---|---|
| PATENT NO. | : 12,094,358 B2 |
| APPLICATION NO. | : 16/915270 |
| DATED | : September 17, 2024 |
| INVENTOR(S) | : Evan Jon Propst et al. |

Page 1 of 1

It is certified that error appears in the above-identified patent and that said Letters Patent is hereby corrected as shown below:

In the Specification

In the SUMMARY OF THE INVENTION:

Column 2, Lines 25-26: please change [[sternocleidomastoideoles]] to --sternocleidomastoid muscles--.

In the BRIEF DESCRIPTION OF THE DRAWINGS:

Column 6, Line 45: please change [[sternocleidomastoideoles]] to --sternocleidomastoid muscles--.

Column 6, Line 67: please change [[sternocleidomastoideole]] to --sternocleidomastoid muscle--.

In the DETAILED DESCRIPTION:

Column 10, Line 7: please change [[sternocleidomastoideoles]] to --sternocleidomastoid muscles--.

Column 10, Line 30: please change [[sternocleidomastoideole]] to --sternocleidomastoid muscle--.

Column 11, Line 54: please change [[The bolded values in Table 2 are the preferred properties of the current simulator]] to --The first listed values for each anatomical structure in Table 2 are the preferred properties of the current simulator--.

Column 22, Line 13: please change [[sternocleidomastoideoles]] to --sternocleidomastoid muscles--.

Column 26, Line 20: please change [[sternocleidomastoideoles]] to --sternocleidomastoid muscles--.

Signed and Sealed this
Fourth Day of March, 2025

Coke Morgan Stewart
*Acting Director of the United States Patent and Trademark Office*